US008958104B2

(12) United States Patent
Comstock et al.

(10) Patent No.: US 8,958,104 B2
(45) Date of Patent: Feb. 17, 2015

(54) UNIVERSAL ORDERING FOR MANUFACTURING CUSTOMIZED PRINT PRODUCTS

(71) Applicants: Samuel J Comstock, Kirkland, WA (US); Gregory Gaskill Dent, Seattle, WA (US); Jianming Zhang, Seattle, WA (US); Christopher Cunningham, Seattle, WA (US); Marcus van Kempen, Belgium (NL)

(72) Inventors: Samuel J Comstock, Kirkland, WA (US); Gregory Gaskill Dent, Seattle, WA (US); Jianming Zhang, Seattle, WA (US); Christopher Cunningham, Seattle, WA (US); Marcus van Kempen, Belgium (NL)

(73) Assignee: Reischling Press, Inc.

( * ) Notice: Subject to any disclaimer, the term of this patent is extended or adjusted under 35 U.S.C. 154(b) by 0 days.

(21) Appl. No.: 14/132,545

(22) Filed: Dec. 18, 2013

(65) Prior Publication Data

US 2014/0108188 A1 Apr. 17, 2014

Related U.S. Application Data

(63) Continuation-in-part of application No. 13/648,090, filed on Oct. 9, 2012, now Pat. No. 8,736,885.

(51) Int. Cl.

| | |
|---|---|
| ***G06Q 30/06*** | (2012.01) |
| ***G06F 3/12*** | (2006.01) |
| ***G06Q 10/08*** | (2012.01) |
| ***G06Q 10/06*** | (2012.01) |

(52) U.S. Cl.

CPC ........ *G06Q 30/0621* (2013.01); *G06Q 30/0635* (2013.01); *G06F 3/1296* (2013.01); *G06F 3/1272* (2013.01); *G06F 3/1287* (2013.01); *G06Q 10/06* (2013.01); *G06Q 10/083* (2013.01)

USPC ........ 358/1.15; 358/1.12; 358/1.16; 358/1.18

(58) Field of Classification Search

USPC .............. 358/1.12, 1.15, 1.16, 1.18, 402, 1.1, 358/1.9, 1.11; 705/408, 26

See application file for complete search history.

(56) References Cited

U.S. PATENT DOCUMENTS

2005/0105129 A1* 5/2005 Takahashi .................... 358/1.15

* cited by examiner

*Primary Examiner* — Allen H Nguyen

(74) *Attorney, Agent, or Firm* — Soquel Group LLC

(57) ABSTRACT

A computer-implemented method for multi-vendor printing including maintaining a data store that includes information about service level agreements with partner systems, wherein a partner system enables customers to order a plurality of customized print products, and wherein a service level agreement designates maximum delays for manufacturing customer print orders, and characteristics of print vendors, receiving a customer print order from one of the partner systems, the print order specifying a customized print product, determining a latest ship date for the customized print product, selecting one of the print vendors to manufacture the customized print product, and receiving updates from the selected print vendor and relaying the received updates to the partner system that issued the customer print order.

20 Claims, 19 Drawing Sheets

| Scan to Reprint | | | | Close |
|---|---|---|---|---|
| 1510 → Barcode | | | | |
| 1520 → Scan Type | ○ Entire Lot<br>◉ Single Item<br>○ Entire Lot with Scan Verification | | | |
| 1530 → ☐ Apply Reason Code | | | | |
| Last Items Updated | | | | |
| ORDERID ▾ | ORDERLINEITEMID ▾ | ORDERSERIAL ▾ | STATUS DESC ▾ | LOTDESC |
| 1540 → 1181111 | 1371689 | 224833 | VOIDED | 116 2007 07 15 23 14 13 551 |

UNIVERSAL ORDERING FOR MANUFACTURING CUSTOMIZED PRINT PRODUCTS

PRIORITY CLAIM

This application is a continuation-in-part and of U.S. patent application Ser. No. 13/648,090, entitled MULTI-PRODUCT PRINTING WORKFLOW SYSTEM WITH DYNAMIC SCHEDULING, filed on Oct. 9, 2012 by inventors Mark Gustafson and Sam Comstock, which is a continuation of U.S. patent application Ser. No. 12/011,169, entitled MULTIPRODUCT PRINTING WORKFLOW SYSTEM WITH DYNAMIC SCHEDULING, filed on Jan. 23, 2008 by inventors Mark Gustafson and Sam Comstock.

BACKGROUND OF THE INVENTION

Popular web sites now enable customers to create and order a variety of personalized print products, including inter alia calendars, greetings cards, notepads, and photo books. Customers insert their own text and photos within templates provided on the web sites and in retail stores, and fulfillers print the resulting photo products. Such web sites include www.snapfish.com operated by Hewlett-Packard Company of Palo Alto, Calif., www.shutterfly.com operated by Shutterfly, Inc. of Redwood City, Calif. and www.blurb.com operated by Blurb, Inc. of San Francisco, Calif. Such retailers include Walmart and Walgreens.

There are an increasingly large number of types of personalized print products, including books, calendars, note pads, and T-shirts. As such, multiproduct printing systems that receives orders for a variety of personal printing products must be able to print and manage a large number of types of print jobs. One strategy to enable a multiproduct printing system to print all the types of print products required is to direct orders to multiple printing facilities. For example, one printing facility may specialize in printing books and another may specialize in printing on T-shirts.

Competitive pressures also require a multiproduct printing system to be able to print and ship products very quickly. For example, it is typical for a printing system to print and ship an order in a day or two. This may be challenging when a recipient of the product is at a considerable distance, for example in another country, where express shipping may be prohibitively expensive or not available. One strategy for accommodating delivery to recipients in different geographic regions is to direct the print job to a facility closer to the customer or to a hub that can deliver quickly.

There is thus a need for a method and system to efficiently manage and route orders of personalized print products among multiple printing facilities, in order to guarantee fast delivery.

SUMMARY OF THE DESCRIPTION

The present invention concerns a system and method for receiving orders for customized print products from a number of partners and managing the manufacturing or fulfillment of the orders by a plurality of print vendors. The invention receives orders for custom print products and routes the orders to print vendors based on criteria and provides updates or tracking messages to the partners at various stages of the manufacturing process.

In accordance with an embodiment of the present invention, customer orders are transmitted to a printing system via partners, such as web sites and retail stores. The printing system has an agreement with each partner, referred to as a service level agreement (SLA), which stipulates the terms and conditions of the service provided by the printing system to the partner. Terms of the SLA include legal terms such as indemnifications, and pricing terms. In addition, the SLA includes a maximum time delay from the time a customer order is entered into the printing system until the order is finished and ready for shipping.

In accordance with an embodiment of the present invention, the end-to-end printing workflow is represented as a plurality of processing states through which a print order advances as it moves through the printing system.

It will thus be appreciated by those skilled in the art that the present invention provides for comprehensive and optimized management and monitoring of an end-to-end printing workflow for complex business environments with large numbers of diverse small run print orders. The present invention also provides for control of work priorities at various stages of the workflow in order to meet contractual deadlines for finishing orders.

There is thus provided in accordance with an embodiment of the present invention a computer-implemented method for mufti-vendor printing including maintaining, by a server computer, a data store including (1) information about service level agreements with a plurality of partner systems, wherein a partner system enables customers to order a plurality of customized print products, and wherein a service level agreement designates maximum delays for manufacturing customer print orders, and (2) characteristics of a plurality of print vendors, each print vendor capable of printing at least one of the customized print products, receiving, by the server computer, a customer print order from one of the plurality of partner systems, the print order specifying a customized print product, determining, by the server computer, a latest ship date for the customized print product that specifies the latest date to ship the customized print product to the customer to meet the maximum delay requirements of the applicable service level agreement, selecting, by the server computer, one of the print vendors to manufacture the customized print product, receiving, by the server computer, updates from the selected print vendor each update indicating a processing state of the customized print product order, and relaying, by the server computer, the received updates to the partner system that issued the customer print order.

BRIEF DESCRIPTION OF THE DRAWINGS

The subject invention will be more fully understood and appreciated from the following detailed description, taken in conjunction with the drawings in which.

DETAILED DESCRIPTION

Figure 1:
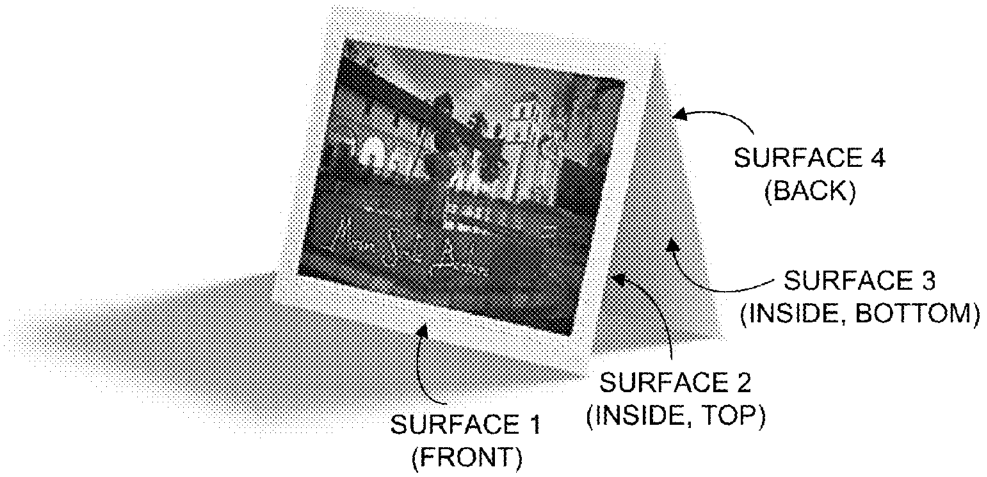
FIG. 1 is a depiction of a greeting card with four surfaces, in accordance with an embodiment of the subject invention.

The present invention concerns a printing system that accepts orders from business partners and manages a print workflow to enable the printing system to meet service level agreements (SLAs). The printing system is operated by a printing system provider. Print orders flow into the system from one or more partners, where a partner is a company or organization that operates a system, referred to as a "partner system," that receives print orders from retail customers. The partner system can be inter alia a web-based system or a retail store. For each partner there is a service level agreement ("SLA") between the printing system provider and the partner that defines inter alia the products that the printing system can accept and print, and the maximum delay to be incurred in printing each product. The present invention relates to the ability of the printing system to meet the SLA-defined maximum delay requirements.

For purposes of clarity, a print order, or simply an "order," includes one or more copies of one or more print products. An order is equivalent to a shopping cart in an ecommerce system. The order can have multiple line items where each line item designates a unique product to be printed. In addition, an order may include one ore more embellishments. An embellishment is an item, such as a coupon, that may not be explicitly ordered by a retail customer but which is added to one or more of the packages shipped to the recipient of the order. Embellishments may include inter alia a coupon, a free sample, or promotional literature.

A maximum allowed delay incurred in printing a product, referred to as "Max_Delay," is defined as an upper limit on the amount of time spent from the moment that a print order for a printed product is accepted into the print system until the moment the printed product is picked up by a shipping service. The Max_Delay includes the time to perform various prepress steps, then to raster image process ("RIP") and print the document, and then to finish the document. The finishing process includes binding, packaging and printing a packing slip and a mailing label.

A line item, also known as a stock keeping unit (SKU) or a part, refers to a single product. Example line items include photo books, notepads, and greeting cards. A line item has attributes including inter alia a quantity and a number of pages. A line item with quantity greater than one, i.e., multiple copies of the same product, can be shipped to multiple recipients. For example, if four copies of a calendar are printed, three may be shipped to one recipient and one to a different recipient. A line item is composed of one or more "material parts." For example, a photo book consists of a cover, a spine and book pages, referred to as "book block". Each of the components (e.g. cover, spine, book block) of a line item or product is referred to as a "material part." Some material parts are printed items, e.g. greetings cards and calendars; other material parts are non-printed items such as a velum separator page or a red cover.

Reference is now made to FIG. 1 which is a depiction of a greeting card with four surfaces, in accordance with an embodiment of the subject invention. Generally, each product to be printed consists of one or more "surfaces" where a surface is defined as a printed side of a page. For example, a page in a photo book has two surfaces, front and back, while a greeting card has four surfaces. Thus the greeting card illustrated in FIG. 1 has four surfaces; namely, front, inside top, inside bottom, and back.

In one embodiment, one digital image, referred to as a "composite image" or "composite," is stored by the partner for each surface. The composite image exactly represents the surface to be printed. The use of composite images between the partner and the printing system allows the printing system to provide WYSIWG (what you see is what you get) printing. In other words, the document that the customer sees on their display appears identical to the printed product that they receive in the mail. In order to achieve WYSIWG printing, the composite is typically an image that covers the entire surface and that is reproduced as precisely as possible by the subject invention.

Figure 2:
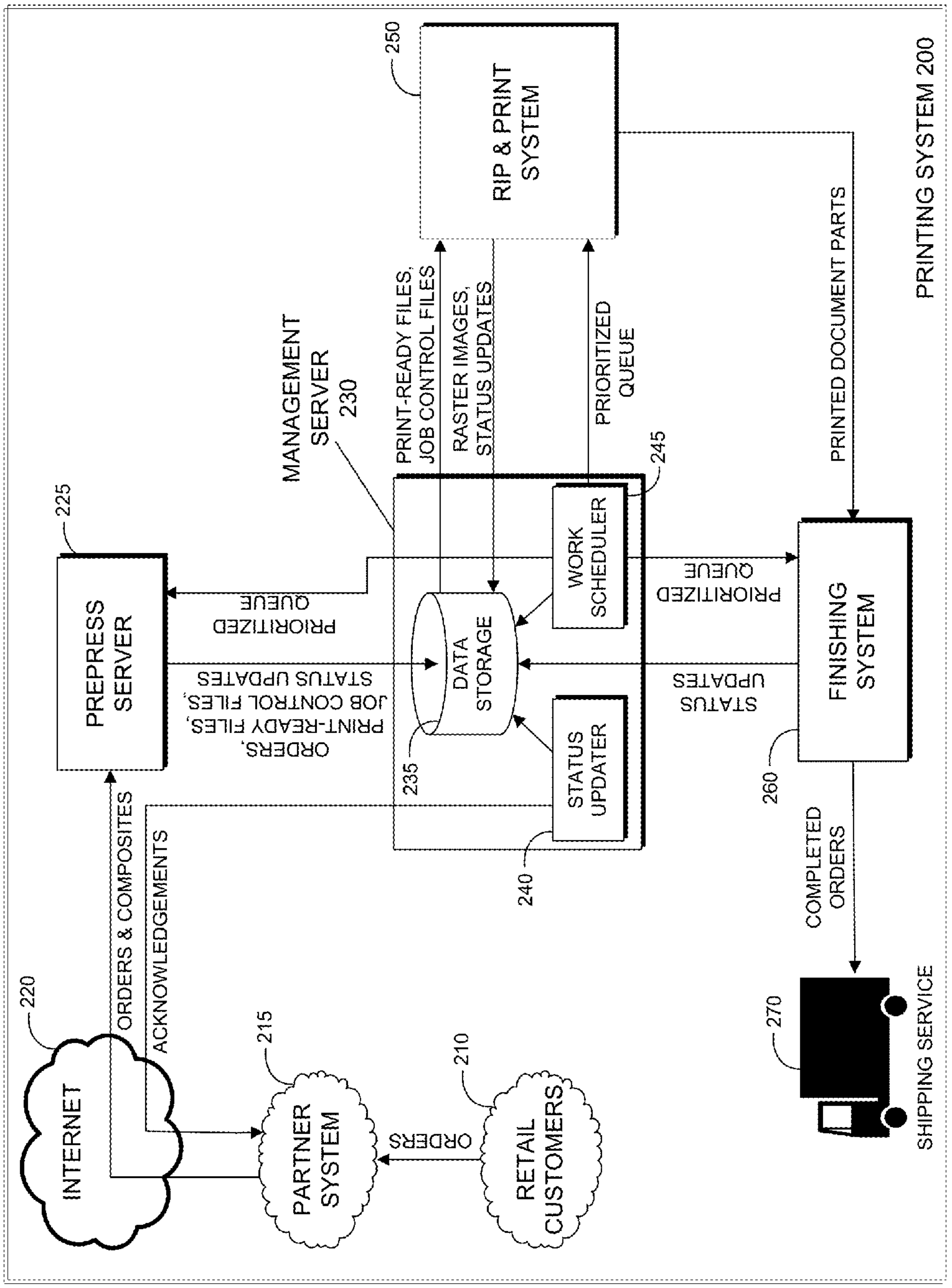
FIG. 2 is a simplified block diagram of a printing system, in accordance with an embodiment of the subject invention.
Figure 3:
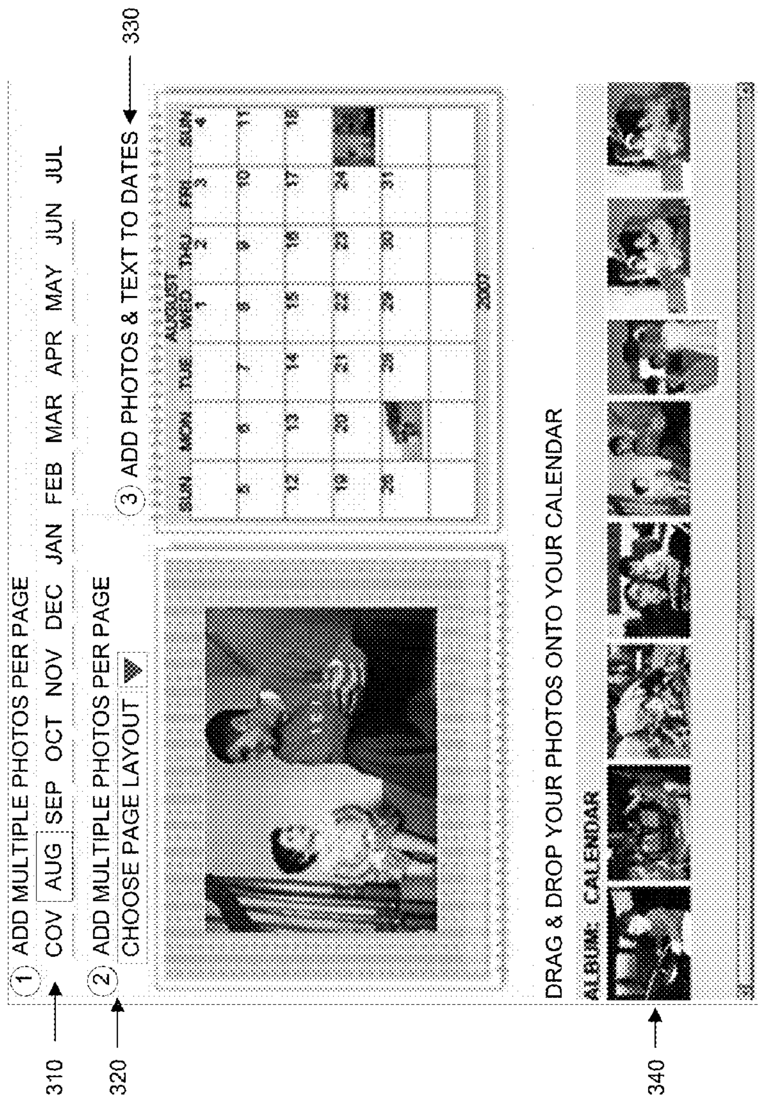
FIG. 3 is an exemplary web user interface used by a retail customer to create a calendar, in accordance with an embodiment of the subject invention.

Reference is now made to FIG. 2, a simplified block diagram of a printing system 200, in accordance with an embodiment of the subject invention. Retail customers 210 place orders with partner system 215. An order may be placed inter alia using a web interface or may be made in a retail store. An order may include multiple products, or "line items," and multiple copies of each line item. Line items are printed items such as calendars, notepads, and books that typically include content supplied by a retail customer. For example, a calendar may include one photo for each month of the year provided by the retail customer; and a notepad may include the name of the retail customer. An example of a web user interface for creating a calendar is illustrated in FIG. 3. An order may also include “variable data”, i.e. data that varies for each copy of a product. For example, variable data can include addressees in the case of custom printed cards with printed addresses. Another example is recipient information that is encoded in a barcode that is printed on each copy of a printed product such as a coupon.

An order is typically stored in a computer file. An order can be represented inter alia as a text file, as a coded binary file, as an HTML formatted file, or as an XML formatted file. In one embodiment, an order is represented by a single XML file with a schema defined by the print system. This schema is referred to as the “native XML format” of the print service. In one embodiment, a single XML file can contain multiple orders.

In one embodiment, partner system 215 represents orders using a proprietary file format. In this case, printing system 200 transforms the proprietary format into its native XML format.

Reference is now made to FIG. 3, an exemplary web user interface used by a retail customer to create a calendar, in accordance with an embodiment of the subject invention. FIG. 3 is displayed after a customer selects calendar as the product type he/she wishes to create. The customer selects the month he/she wishes to create 310. The customer can change the default page layout 320. The customer can add text and/or photos to individual dates 330. The customer selects photos from a gallery of photos that is displayed at the bottom of the screen 340. The exemplary user interface depicted in FIG. 3 shows two surfaces that would be visible for the month of August 2007: on the left of the screen is a single, large, user-supplied photo; and the right side of the screen shows a graphical layout for the month of August, which includes two small user-supplied photos and several textual comments.

Figure 4:
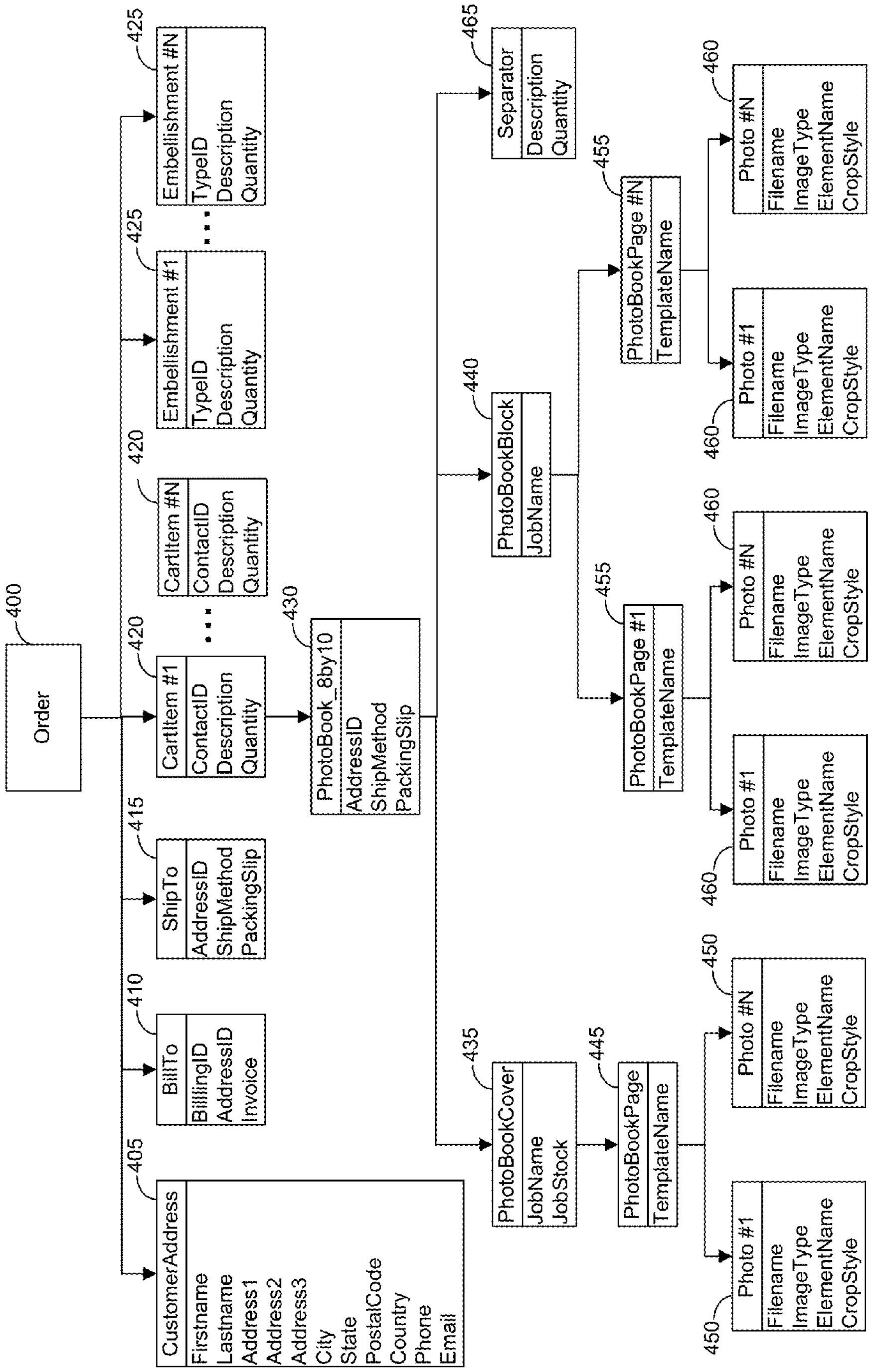
FIG. 4 is a schematic description of a simplified order of a photo book, in accordance with an embodiment of the subject invention.

Reference is now made to FIG. 4, a schematic description of a simplified order of a photo book, in accordance with an embodiment of the subject invention. An order 400 includes CustomerAddress information 405, BillTo information 410, ShipTo information 415, one or more CartItems 420 and optionally or more Embellishments 425. It is noted that a CartItem is also referred to as a line item. Order 400 includes a single 8×10 inch photo book, referred to as PhotoBook_8by10 430. Photo book 430 includes a PhotoBookCover 435, a PhotoBookBookBlock 440, and a NonPrintableMaterial 465. Typically, NonPrintableMaterial 465 is a velum separator page between the cover and the first page of book block. PhotoBookCover 435 includes a single PhotoBookPage 445, which may contain one or more photo 450 elements. PhotoBookBookBlock 440 includes one or more PhotoBookPage 455 elements. Each PhotoBookPage 455 includes one or more photo 460 elements.

In one embodiment, the format of each printed element, such as cover page and book block pages, is defined by a template that is commonly agreed to between the partner and the printing system provider. Thus, in FIG. 4 the photo book cover template is specified by a TemplateName attribute within PhotoBookPage 445. Similarly, the template of each book block page is specified by the TemplateName attribute within PhotoBookPage 455. Use of said commonly agreed to templates ensures that each line item can be processed by the printing system. Also, when using said commonly agreed to templates only information not defined by the template need be included in the order. For example, a calendar page template might define the position of textual, graphical and user-supplied photos for a cover and for each month of the year. Since this formatting information is defined in the template and stored by the printing system it doesn’t have to be included in the order.

In one embodiment, PhotoBookPage 445 contains multiple photos, indicated by Photo #1 450, and Photo #N 450. The number of photos and size and location of each photo are specified by the template referred to by the TemplateName attribute within PhotoBookPage 455. Each photo can be inter alia supplied by the customer, selected by the customer from a list of photos presented by the partner, or supplied by the partner with no input from the customer.

In one embodiment, each surface is provided by the partner as a composite image that includes all required information to print one surface. In this embodiment, each PhotoBookPage 445 element includes a single photo 450 element whose filename attribute references a single composite image.

The XML code for a simplified, exemplary, order for a photo book that follows the schema depicted in FIG. 4 is provided in LISTING 1 at the end of this specification. The order includes a single line item, an 8by10 photo book. The 8by10 photo book includes a cover, 2 book block pages and a velum separator page. Due to the use of templates, formatting information is not required in the XML order.

Referring back to FIG. 2, in one embodiment, partner system 215 receives an order from retail customer 210 and transforms it into the native XML of printing system 200 before providing it via the Internet 220 to printing system 200. In another embodiment, partner system 215 provides the order to printing system 200 in the proprietary format of partner system 215, and printing system 200 transcodes the order into its native XML.

A prepress server 225 receives orders from partner system 215. There are two primary scenarios for receiving orders, “push” and “pull.” In the “push” case, former partner system 215 actively sends orders to prepress server 225. In the “pull” case, partner system 215 stores orders, e.g. on a file transfer protocol (ftp) site, and prepress server 225 periodically retrieves the orders using ftp.

In both cases the order may be in the preferred format of the printing system, or may be in a proprietary format that requires translation by the printing system. Prepress server 225 “serializes” each order. When an order is serialized, each line item in the order is decomposed into one or more material parts. Each printed material part is assigned a unique serial number. For example, in a photo book the cover and the book block would be assigned two different serial numbers. Each serialized item can be individually managed and tracked. Further, line items with quantity greater than one are individually serialized. Non-printed material parts are not assigned serial numbers since they are not customized; only a part number is necessary to uniquely denote a non-printed material part. Each serialized material part is processed in a series of steps, first by prepress server 225, then by a RIP and print system 250 and finally by a finishing system 260.

It is pointed out that in some cases a processing step is performed on an order, in some cases on a single material part and in some cases on multiple material parts. For purposes of clarity, the term “work item” is used to refer to a data structure that defines the atomic or most granular level of processing performed at a particular processing step in the printing workflow, regardless of whether it is performed on an order or on one or more material parts.

Each work item has a state associated therewith. TABLE 1 lists one embodiment of the states that a work item can be in. Specifically, Table 1 represents an embodiment of a workflow that is specific to bound books. Alternate workflows can be incorporated to accommodate production of different customized goods. For example, cards and calendars follow a slightly different set of steps than bound books while workflows for non-paper substrates like t-shirts and mugs have even more distinguished workflows. Upon completion of certain processing steps, the state associated with the work item is changed to a new state. This is referred to as updating the work item's state. A work item's state determines what processing step will next be performed on it.

TABLE 1

Processing States

| ID | State Name | Where Occurs | Short Description |
|---|---|---|---|
| 1 | Hold | Prepress | The work item is on hold for a non system failure, such as missing images or corrupt images, also duplicate orders from the partners will be parked in hold for manual release. |
| 2 | Error | Prepress | The work item has failed to process because of a system failure - the printing system will automatically re-process the work item |
| 3 | Pending-Order-Import | Prepress | Order has been received from a partner and is available for processing and import into data storage. |
| 4 | Pre-Order_Import-Error | Prepress | An error occurred while processing an order. The order cannot be imported into data storage. |
| 5 | Pre-Batch | Prepress | The order has been successfully accepted into the system |
| 6 | Reprint | Prepress | A temporary place for work items that were mishandled and need reprinting |
| 7 | Downloaded | Prepress | All composite images within the order have been downloaded or moved to data storage |
| 8 | Imaged | Prepress | All composite images within the order have been verified. |
| 9 | Processed | Prepress | The order has been serialized into work items or serial items and is ready for lotting. |
| 10 | Lotted | Prepress | The serial item has been grouped into a lot. The lot is ready for raster image processing. |
| 11 | Imported | RIP & Print | The lot has been accepted by the rater image processor (RIP). |
| 12 | Ready-to-Print | RIP & Print | The lot has been rasterized and is ready for press |
| 13 | Moved-to-Press | RIP & Print | The lot has been moved to a press for printing |
| 14 | Imported-to-Press | RIP & Print | The printing press has accepted the lot for printing |
| 15 | Printed | RIP & Print | The lot has been printed |
| 16 | Bindery | Finishing | The serial item is in the bindery |
| 17 | Bound | Finishing | The serial item is bound and ready for sorting and fulfillment |
| 18 | Ready-to-Ship | Finishing | The serial item is sorted and ready to be packaged |
| 19 | Packaged | Finishing | The serial item has been placed into a package for shipping |
| 20 | Shipped | Finishing | The serial item has been shipped |
| 21 | Voided | Finishing | The serial item has been voided |

A management server 230 performs tasks that are common to multiple processing steps including work schedule management performed by a work scheduler 245, communication of status to partner 215, performed by a status updater 240, and data storage and management performed by a data storage 235. It will be appreciated by those skilled in the art that management server 230 may be a separate computer system, or it may be configured as hardware or software running inside of prepress server 225, print server 1110 (described with reference to FIG. 11), or finishing server 1305 (described with reference to FIG. 13). It will be further appreciated that management server 230 may be several computer systems, each configured to run one or more processes. For example, one management server 230 may run work scheduler 245 and status updater 240, while another management server runs data storage 235.

Data storage 235 includes a relational database management system (RDBMS) and physical storage. In a preferred embodiment, physical storage is networked and stores elements such as image assets, imposed rendering of orders and lots, and intermediate results from RIP devices. Network attached storage (NAS), which is data storage that can be connected directly to a computer network to provide centralized data access and storage for other network devices, may be used by RDBMS and non-RDBMS and may also be used to store the abovementioned elements. For example, NAS would enable prepress server 225, a print server 1110, or a finishing server 1305 to directly store and share data.

Work scheduler 245 runs periodically as a background process on management server 230. For each state listed in TABLE 1, work scheduler 245 maintains a prioritized queue of all work items awaiting processing for each state. The prioritized queue for each state is stored in data storage 235. When a work item changes state, work scheduler 245 moves the work item to the appropriate prioritized queue. For example, a work item that is being printed is in the prioritized queue for the "Imported-to-Press" state (with reference to TABLE 1). When the work item prints successfully, print server 1130 changes the state of said work item to "Printed." When work scheduler 245 determines that said work item has changed state it moves the work item into the prioritized queue for the "Printed" state. It then recalculates the priorities for all work items in the prioritized queue for the "Printed" state.

In one embodiment, processing steps that correspond to the states Pre-batch, Imaged, Processed, operate at the order level. In one embodiment, the prioritized queue for each of these states lists the orders in first-in-first-out sequence.

Orders whose state is "Processed" state have been serialized into serial items, or material parts, each having a unique serial number. At this point, each work item in the prioritized queue for the "Processed" state corresponds to a material part. Each work item includes inter alia the attributes listed in TABLE 2 below:

TABLE 2

| Work Item Attributes | |
|---|---|
| Attribute Name | Description |
| Order_ID | The order that this work item pertains to. |
| Material_Part_ID | Material part identifier |
| Tote_ID | Identifier for the physical container that printed material parts are to be placed into |
| Late_Priority | BOOLEAN (TRUE, FALSE). The current estimate of whether the order to which the material part belongs will exceed SLA delay if any further delay is incurred in processing this material part. Described in greater detail relative to FIG. 6. |
| Shop_Priority | Date. The current estimate of the date at which the order to which the material part belongs, will complete processing. Described in greater detail relative to FIG. 6. |
| Destination | Shipping destination of the part to which this material part belongs. |
| Single_Part | BOOLEAN (TRUE, FALSE). Does this part comprise multiple material parts? |
| Destination_Part_Quantity | Quantity of parts being shipped to same destination. |
| Order_Priority | Date. Priority of the order, computed when the order is first accepted by the system. |
| N-up Priority | Check the waste percentage and determine if this print lot is able to be created. If it fails the test the print lot will not be created and all parts will be put back into the pool. (Applies to variable length parts only.) |
| State | State of the work item: completed, pending, error. |

It is to be noted that not all of the work item attributes are necessary or available at each processing step. For example, the Tote_ID attribute isn't assigned until a work item reaches the "Lotted" state.

Work scheduler 245 sorts the queue of work items using the attributes listed in TABLE 2 as sort keys to produce a prioritized queue. The order of the sort keys and the sorting algorithm itself may vary at each processing step.

Periodically, work scheduler 245 recalculates the late priority and shop priority attributes of each work item. It then sorts the prioritized queue to both maximize efficiency and minimize the risk that the time to process any of the orders dependent on work items in the prioritized queue will exceed the SLA-defined Max_Delay period. The order of work items allows the processing module associated with each state to simply select the first work item in the prioritized queue and begin processing. Methods employed by work scheduler 245 to prioritize work items are further described with reference to FIG. 6.

Using a network data transfer protocol, prepress server 225 receives an order and any composite files included in the order from partner system 215 and then performs a series of processing steps to prepare the orders for printing. The output from prepress server 225 is one print-ready file and one or more job control files, which are stored in data storage 235. Prepress server 225, said print-ready file, and said job control files are described in greater detail relative to FIG. 8 and FIG. 9.

Status updater 240 runs as a background process on management server 230. When status updater 240 detects that a work item has changed status, it updates the status of the corresponding order. In one embodiment, status information for an order is defined as the lowest status of each of the material parts that comprise the order where lowest status is defined by the Table 1 ID value. In one embodiment, status updater 240 notifies partner system 215 of status changes in the form of an email acknowledgement message. In one embodiment, when status updater 240 detects that a n order has changed status, it stores status information in an acknowledgement file on data storage 235. Then, partner system 215 can download the acknowledgement file at its convenience. In one embodiment, the acknowledgement file is in XML format. In another embodiment, status information for each order is provided using a SOAP web service. In this embodiment, partner system 215 requests information for a specific order using a SOAP request message and status updater 240 provides the current status of the order by sending a SOAP response message. The SOAP protocol is maintained by the World Wide Web Consortium (W3C) and the specification can be found at http://www.w3.org/TR/soap/.

When a work item reaches a state of "Lotted" (TABLE 1) it is assigned to RIP and print system 250. The output from RIP and print system 250 is one or more printed material parts that serve as input to finishing system 260. RIP and print system 250 is described in greater detail with reference to FIG. 11.

Printed material parts are then processed by a finishing system 260. Most steps performed by finishing system 260 are performed by human operators, e.g. lamination of printed substrates, banding or kitting of parts. Finishing system 260 first binds printed parts into complete printed products. Finishing system 260 then prints a packing slip, packages the printed products with the packaging slip and affixes a mailing label onto the package. At this point, finishing system 260 assigns the final state of "Shipped" to the work item. When all work items that comprise an order have shipped the order is deemed to be complete. Finishing system 260 is described in greater detail with reference to FIG. 13.

Figure 5:
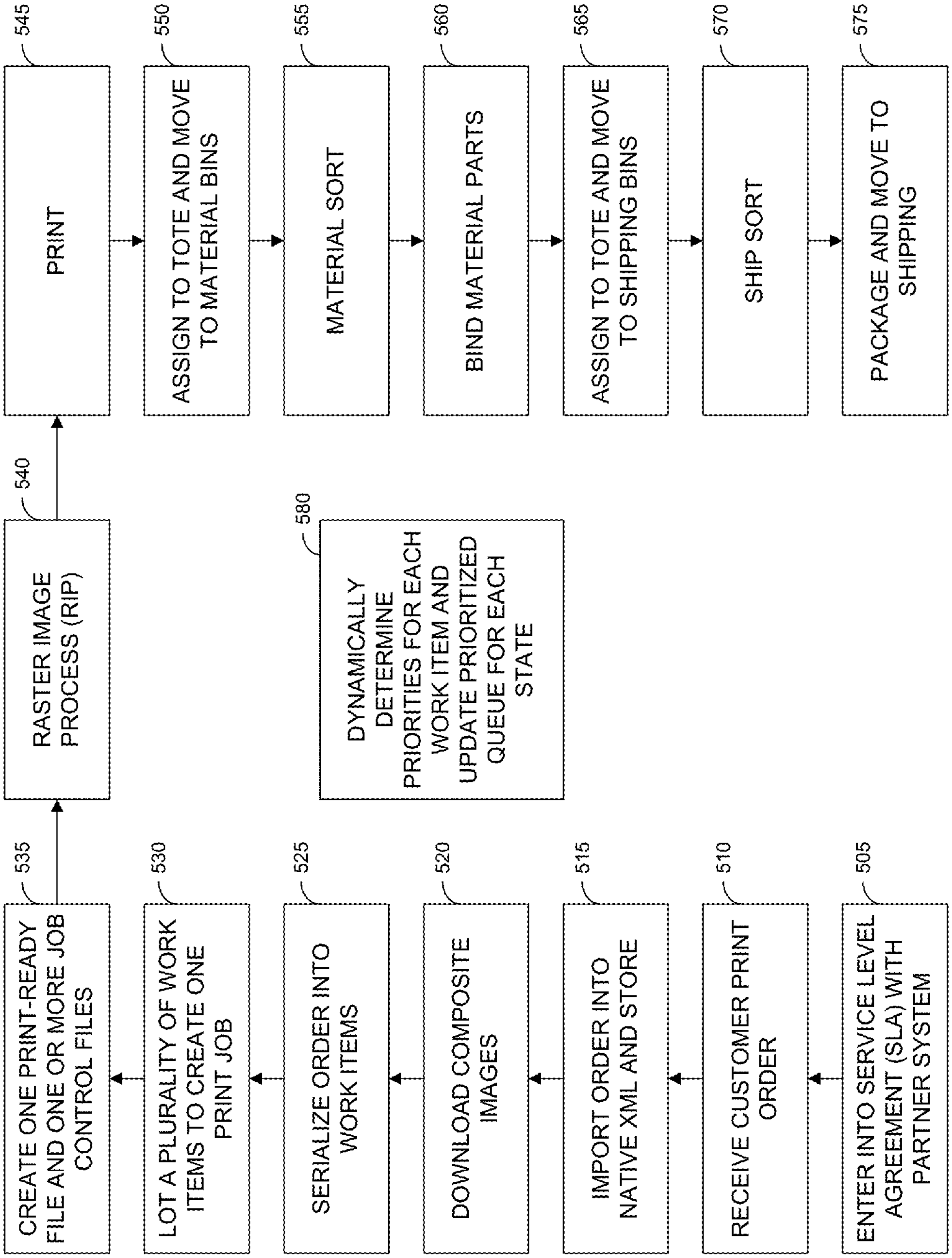
FIG. 5 is a simplified flowchart of an overall method for a printing system, in accordance with an embodiment of the present invention.

Reference is now made to FIG. 5, which is a simplified flowchart of an overall method for a printing system, in accordance with an embodiment of the present invention. At Step 505 printing system 200 enters into a service level agreement (SLA) with a partner system 215. Each SLA defines inter alia a maximum service delay, termed "Max_Delay", for each print product that can be accepted by printing system 200. At Step 510 once the SLA between the partner system and printing system is effective, printing system 200 commences to receive customer print orders from partner system 200. At Step 515 printing system 200 imports an order into its native XML and stores it in data storage 235.

The work performed by printing system 200 to process a print order is divided into a plurality of tasks which are referred to as work items. When the processing of a work item completes, a new state is associated with it. At Step 580 work scheduler 245 maintains a prioritized queue of work items for each state. Work scheduler 580 is depicted independently from the other steps in FIG. 5 because is executes on a scheduled basis independent of the other steps. Work scheduler 245 updates the prioritized queue for each state by calculating the priority of each work item within each prioritized queue. It then orders each prioritized queue using an algorithm that takes into account the updated priorities.

At Step 520 prepress server 225 downloads from partner system 215 one composite image for each image referenced in a print order. At Step 525 prepress server 225 serializes an order into a plurality of work items, also referred to as serial items, where each work item has a unique serial number. At Step 530 one or more work items are lotted to create a print job. At Step 535 prepress server 225 creates one or more print-ready files and one or more job control files that will control the printing process and print the print job. At Step 540 RIP and print system 250 raster image processes a print job and the resulting raster image file(s) is stored in data storage 235. At Step 545 RIP and print system 250 prints a print job. RIP and print system 250 is further described with reference to FIG. 11.

At Step 550, finishing system 260 assigns each work items, which references a single material part, to a tote and a shop floor operator places the material part inside the designated tote. When a tote is full shop floor operator moves the tote near to a designated material bin unit. At Step 555 shop floor operator material sorts the material parts from a tote into designated material bins. Material sorting is further described with reference to FIG. 14. At Step 560 the material parts are bound. At Step 565 finishing system 260 assigns the bound material parts to totes and a shop floor operator moves the totes near to a shipping bin unit. At Step 570 the bound material parts, also referred to as serial items, are ship sorted into designated shipping bins. At Step 575 the bound serial items are withdrawn from the shipping bins, packaged and moved to the shipping area. Finishing system 260 is further described with reference to FIG. 13.

Figure 6:
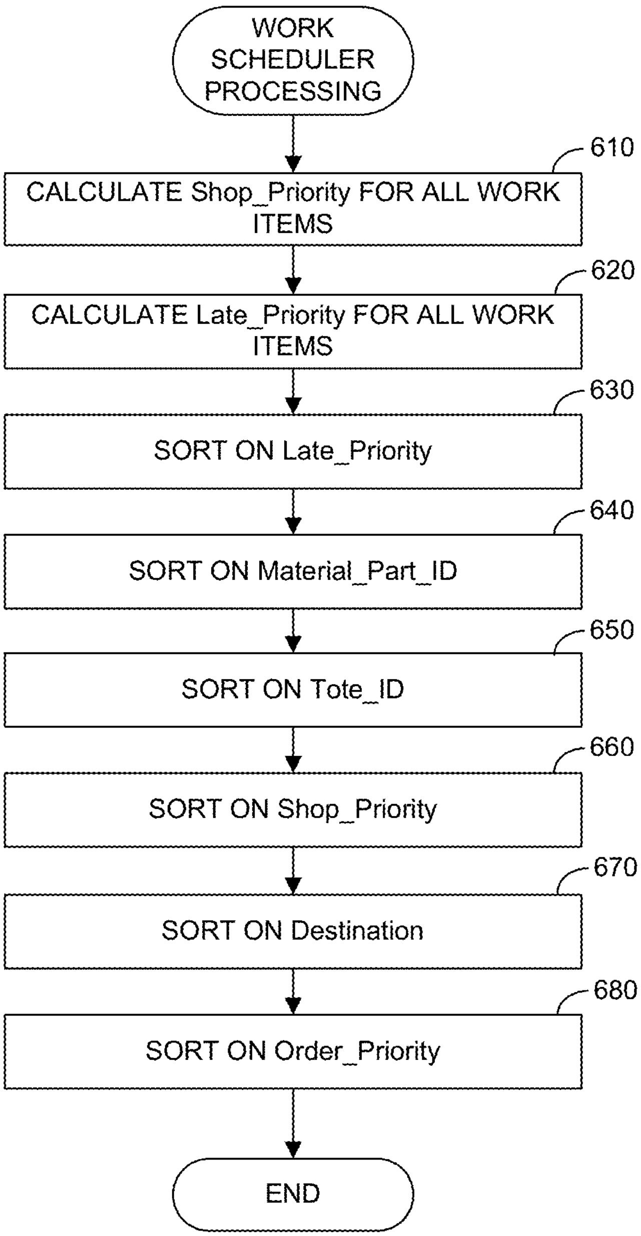
FIG. 6 is a flow diagram describing the processing steps performed by a work scheduler to calculate the priorities of work items, in accordance with an embodiment of the subject invention.

Reference is now made to FIG. 6, which is a flow diagram describing the processing steps performed by work scheduler 245 (FIG. 2) to calculate the priorities of work items, in accordance with an embodiment of the subject invention. Work scheduler 245 executes periodically on management server 230. Work scheduler 245 maintains and periodically updates the order of a prioritized queue of work items for each state. Once an order reaches the "lotted" state, it has been serialized into material parts and the prioritized queue consists of an ordered list of material parts and attributes associated with each material part.

FIG. 6 describes one example method for ordering the prioritized queue of work items for a processing state. It will be appreciated by one skilled in the art that various methods may be used to prioritize the list of work items and that a different method may be used at each state.

At Step 610 the Shop_Priority is calculated for all work items in the prioritized queue. The calculation of Shop_Priority is described relative to FIG. 7A. At Step 620 the Late_Priority attribute is calculated for all work items in the prioritized queue. The calculation of Late_Priority is described relative to FIG. 7B.

At Step 630 the prioritized queue is sorted on the attribute Late_Priority such that all material parts whose Late_Priority attribute is set to TRUE are moved to the top of the queue. Material parts whose Late_Priority attribute is set to TRUE must be processed immediately in order to avoid having their corresponding print product exceed the contractual delay requirement defined in a SLA for the print product, referred to as Max_Delay. Note that if the time spent within printing system 200 exceeds Max_Delay for any product in an order then the entire order is deemed to exceed the Max_Delay requirement.

At Step 640 the prioritized queue is sorted on the Material_Part_ID. At Step 650 the prioritized queue is sorted on the Tote_ID attribute. Totes are described relative to FIG. 13. At Step 660 the prioritized queue is sorted on the Destination attribute. Destination is described relative to FIG. 13. At Step 670 the prioritized queue is sorted on the Order_Priority attribute. Order_Priority is described relative to FIG. 7B.

Figure 7A:
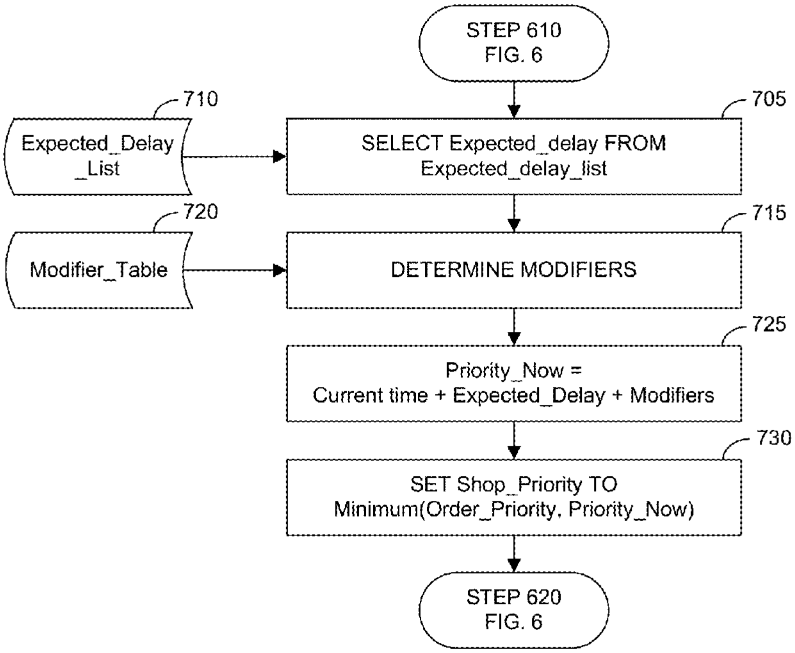
FIG. 7A is a flow diagram describing the processing steps performed by a work scheduler to compute the Shop_Priority attribute for a work item, in accordance with an embodiment of the subject invention.

Reference is now made to FIG. 7A, which is a flow diagram describing the processing steps performed by a work scheduler to compute the SLA-based priority attribute for a work item, in accordance with an embodiment of the subject invention. FIG. 7A describes one algorithm for calculating Shop_Priority, which is a date/time that represents the best estimate of the time when a work item will complete all processing and be picked up by a shipper. This algorithm uses the Order_Priority attribute. Order_Priority defines the latest time that a product can be completed and not exceed the Max_Delay requirement. Order_Priority is defined as:

Order_Priority=Order_Accepted_Time+Max_Delay, where Order_Accepted_Time is the time when the order was accepted into the system, i.e. when the order status was changed to "imaged" by prepress server 225. For purposes of clarity, Order_Priority is a date that represents the priority or urgency of a work item relative to other work items in a prioritized queue. The earlier the date, the faster the corresponding work item needs to be processed.

Referring to FIG. 7A, at Step 705, using the Material_Part_ID and the current status of the work item as indices, work scheduler 245 looks up the Expected_Delay from a list of expected delays named Expected_Delay_List 710. In one embodiment, Expected_Delay_List 710 has a format as illustrated below in TABLE 3.

TABLE 3

| Expected_Delay_List (in minutes) | | | | |
|---|---|---|---|---|
| | Line Item | | | |
| Current State | 001-123 (Photo Book) | 002-432 (Sticker) | 003-456 (Notecard) | 004-789 (Calendar) |
| Imaged | 420 | 340 | 310 | 410 |
| Processed | 402 | 322 | 192 | 392 |
| Lotted | 370 | 307 | 277 | 360 |
| Imported | 328 | 301 | 271 | 315 |
| Ready_To_Print | 315 | 285 | 255 | 301 |
| Moved_To_Press | 245 | 265 | 235 | 235 |
| Press_Imported | 210 | 213 | 215 | 201 |

TABLE 3-continued

| Expected_Delay_List (in minutes) | | | | |
|---|---|---|---|---|
| | Line Item | | | |
| Current State | 001-123 (Photo Book) | 002-432 (Sticker) | 003-456 (Notecard) | 004-789 (Calendar) |
| Printed | 130 | 124 | 132 | 122 |
| Bindery | 110 | 112 | 104 | 99 |
| Bound | 102 | 100 | 82 | 87 |
| Ready_To_Ship | 73 | 65 | 53 | 62 |
| Packaged | 42 | 34 | 40 | 34 |
| Shipped | — | — | — | — |

In one embodiment, an Expected_Delay value from the Expected_Delay_List is the empirically determined average number of minutes for a work item to complete processing, i.e. move from a given state to the final state (State=Shipped). For example, using TABLE 3, a photo book whose state is "Lotted" will require 370 minutes on average to reach the "Shipped" state, i.e. to complete processing.

At Step 715, work scheduler 245 consults Modifier_TABLE 720 to determine if there are any "modifiers" that must be taken into account when determining job priority. Modifiers are values that are subtracted or added to the priority in order to respectively increase or decrease priority. Modifiers can be inter alia per customer, per partner, per part, or per order. For example, for a two week period all orders coming from a specific partner can be increased in priority by 1 hour. As another example, if an order had been delayed for a particular customer, then future orders for that customer can be accorded higher priority for a period of time using modifiers.

At Step 725 Priority_Now is calculated by adding together the current time, the Expected_Delay determined at Step 705 and any modifiers determined at Step 715. In one embodiment, times are represented as the number of minutes since a reference time, which is taken to be Jan. 1, 1900. In another embodiment, times are represented as days and fractions of days since a reference time.

At Step 730, the work item's Shop_Priority attribute is set to the smaller of Order_Priority and Priority_Now.

Figure 7B:
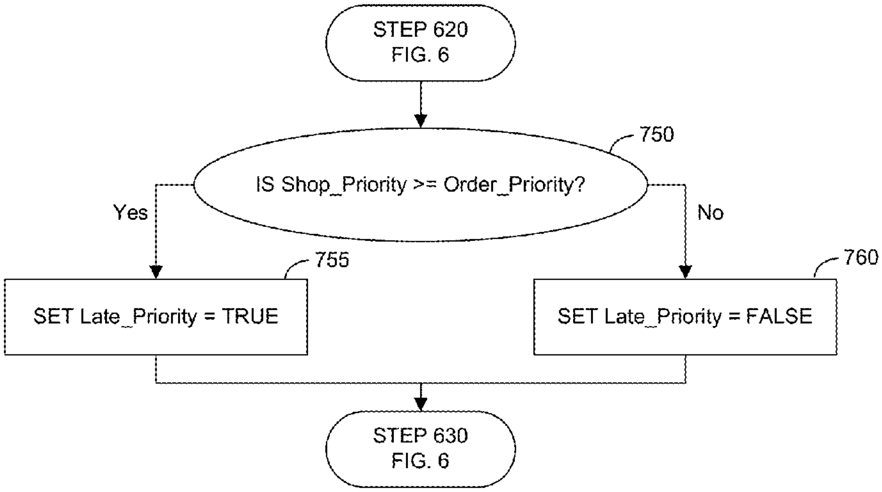
FIG. 7B is a flow diagram describing the processing steps performed by a work scheduler to calculate the Late_Priority attribute for a work item, in accordance with an embodiment of the subject invention.

Reference is now made to FIG. 7B, which is a flow diagram describing the processing steps performed by a work scheduler to calculate the Late_Priority attribute for a work item, in accordance with an embodiment of the subject invention. At Step 750 a determination is made as to whether Shop_Priority is greater than or equal to Order_Priority. If this is the case, then the order corresponding to the work item is in danger of being late; accordingly, at Step 755 the Late_Priority attribute is set to TRUE. If Shop_Priority is less than Order_Priority then there is some slack time and at Step 760 Late_Priority is set to FALSE.

As an example of the way that priorities come into play, the book block and cover of a photo book each comprise different work items, are assigned different serial numbers, and are processed separately by the prepress system and the RIP and print system. Typically, book block and covers will be printed in different print runs on different printers. While both the book block and cover of a photo book will each have the same Order_Priority, work scheduler 235 will calculate different Shop_Priorities for each work item at each state to reflect the different delays that each component will experience. This step-by-step approach to scheduling guarantees that the entire order is printed on time, per the Max_Delay requirement.

Figure 8:
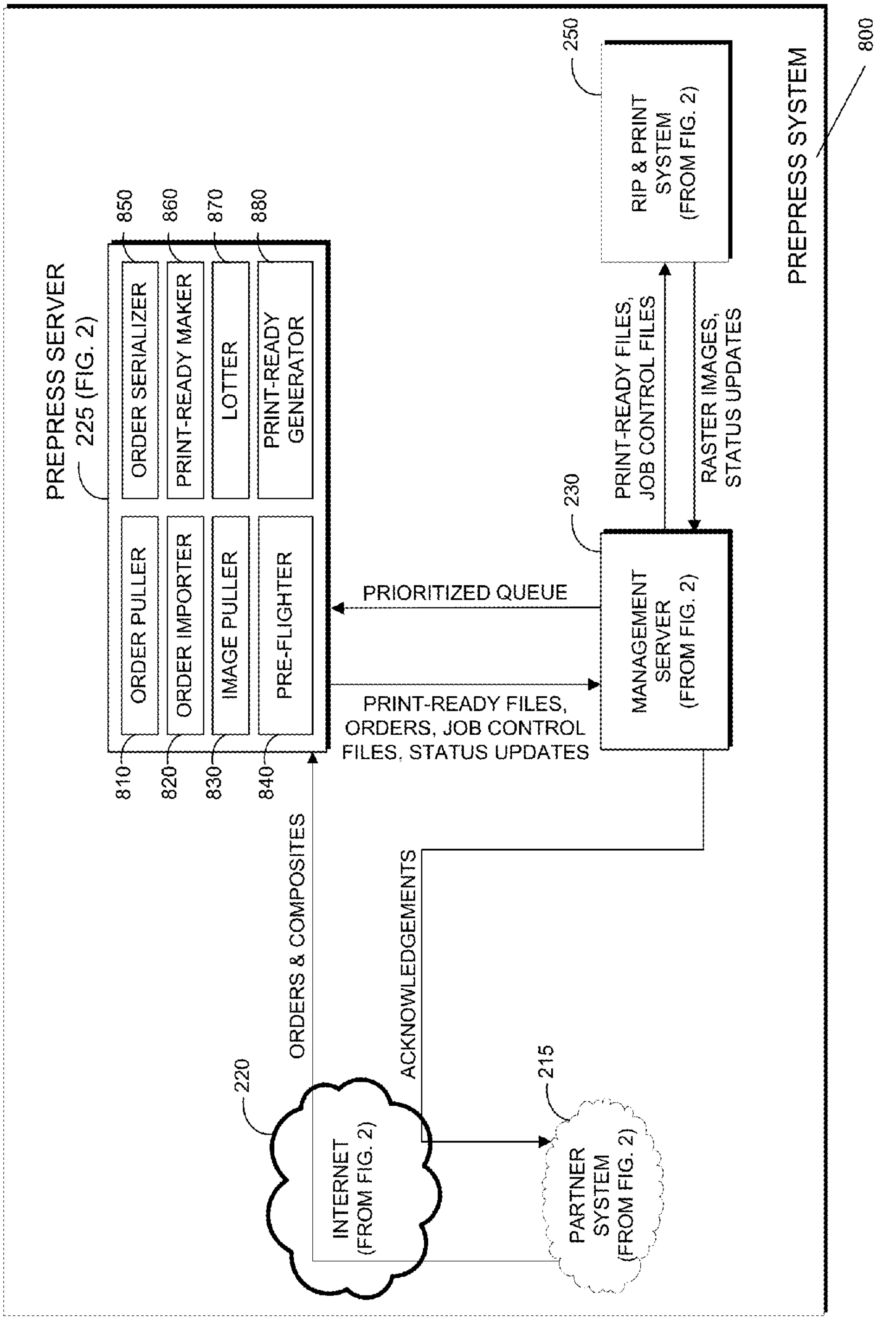
FIG. 8 is a simplified block diagram of a prepress system, in accordance with an embodiment of the subject invention.

Reference is now made to FIG. 8, which is a simplified block diagram of a prepress system, in accordance with an embodiment of the subject invention. Relative to FIG. 2, this block diagram introduces additional detail concerning prepress server 225.

An order puller 810 downloads orders from partner system 215 (FIG. 2), using an appropriate file transfer method. File transfer methods performed by order puller 810 include File Transfer Protocol (FTP), Hypertext Transfer Protocol (HTTP), and Simple Object Access Protocol (SOAP).

An order importer 820 transforms the order into the native XML format of the printing system and stores it in data storage 235 (FIG. 2). The XML attributes of the order are stored in a relational database within data storage 235 according to a pre-defined schema; this provides efficient access to the order data during subsequent processing steps. Order importer 820 also "serializes" the order into material parts that are separately processed. For example, the serialization of a line item consisting of five copies of a single calendar will result in the creation of five work items or serial items, one for each calendar, each with a unique serial number. Serialization enables the printing system to efficiently manage reprints. Thus if one copy of a calendar is damaged, then only that copy need be reprinted.

In one embodiment, partner system 215 provides orders in a proprietary file format; in this case, order importer 820 transforms the non-standard format into the native XML format of the printing service.

In one embodiment, partner system 215 provides orders in a XML format that uses a proprietary schema; in this case, order importer 820 uses XSLT to transform the XML into the native XML format of the printing system. XSLT is a language for transforming XML documents conforming to a first schema into XML documents conforming to a second schema. The XSLT standard is defined and maintained by the worldwide web committee (W3C—see http://www.w3.org/TR/xslt).

An image puller 830 downloads one composite image for each surface referenced in a line item, and stores the composites in storage system 235. For example, if the line item consists of a greetings card, then prepress server 225 downloads four composite image files corresponding to the four surfaces shown in FIG. 1. In one embodiment, a composite image can be in inter alia JPEG, PDF, EPS, BMP or TIFF format. In one embodiment, image puller 830 retrieves composites using standard file transfer methods including FTP, and HTTP. Although a line item may call for a quantity greater than one to be printed, the composite images associated with the line item are only downloaded once.

A pre-flighter 840 "validates" or tests each composite image. Pre-flighter 840 analyzes each image to ensure that the image is formatted correctly and contains meaningful information. In the printing industry, such validation is commonly referred to as "pre-flight." A variety of tests can be performed to ensure that the image data is meaningful. In one embodiment, thumbnails are generated and an operator views the thumbnails to ensure that they are visually meaningful. It is also possible to perform automated tests; for example, correlation tests can identify if the images contain noise or meaningful data. Automated tests may further include computation of a checksum "hash" against the digital contents of files to ensure integrity. Additionally, if multiple composite images are included in a single file, pre-flighter 840 extracts each composite image to a separate file. Additionally, if the composite image is in the PDF file format then the PDF file will be checked to determine if there are mistakes in the PDF file that would cause the composite image to be rejected or printed incorrectly. Examples of mistakes that can be identified include inter alia wrong document size, missing fonts, incorrect image resolution, use of layers, and PDF/X print compliancy.

An order serializer 850 takes an order as input and serializes the order into one or more new work items each of which consists of a single material part. Printed material parts are rasterized and printed by RIP and print system 250. Printed and non-printed material parts are then bound together and packaged by finishing system 260 to form one or more completed, ready-to-ship, products.

A print-ready maker 860 creates one print-ready file for each surface and one or more job control files for the print job. A print ready file describes the formatting and content of a document in a manner suitable for printing. The print-ready file can be in any standard or non-standard page document description format including inter alia PostScript, PDF, Microsoft Word, HTML, and rich text format (RTF). In one embodiment, the print ready file uses the portable data format (PDF). PDF is defined and maintained by Adobe Systems, Inc. More information about PDF can be found at http://www.adobe.com/products/acrobat/adobepdf.html.

Each print-ready file references one or more composite images, which remain in data storage 235. Reference to a composite image is made using comments that are embedded in the print-ready files. The comments follow the open prepress interface (OPI) specification. OPI is defined and maintained by Adobe Systems, Inc. More information about OPI can be found at partners.adobe.com/public/developer/en/ps/5660_OPI_2_0.pdf. The comments specify all information necessary for RIP and print system 250 to substitute the composite image data into the print-ready file during the printing process.

A job control file specifies how PDF files are to be combined and provides information about crop marks, score marks and barcode. The job control file provides information that is specific to the printing workflow but which is not contained in the print-ready file. For example, a job control file specifies inter alia where to place crop marks, and whether to print a bar code and if so where to place it. In one embodiment, the job control file uses job definition format (JDF) standard. JDF is defined and maintained by CIP4. More information about JDF can be found at http://www.cip4.org/.

A lotter 870 combines print jobs together, a process commonly referred to as "lotting." Lotting offers two main advantages: (1) it improves efficiency by increasing the number of material parts printed per print job and thus decreasing the amount of time spent transitioning from one print job to the next, and (2) it minimizes paper wastage for variable length products such as photo books. The lotting process intelligently selects parts that can be combined together into a lot and produces a job control file that provides the necessary information for combining the parts to the printer. In one embodiment, lotting always combines parts of the same type; for example, notepads are only lotted with notepads, calendars are only lotted with calendars. In one embodiment, parts of different types can be combined; for example, notepads and calendars can be printed together as part of a single print run.

Lotting takes into account two cases: (1) the case of fixed length material parts, and (2) the case of variable length material parts. In the case of fixed length material parts, e.g. calendars and notecards, a preset number of material parts are lotted together. For example, in one embodiment, a lot size of 10 calendars is used where possible. Thus if 10 copies of the same calendar have been ordered they can be lotted together to form one print run. Alternatively, if two orders, one for 8 calendars and one for 2 calendars, are waiting in the prioritized queue then they can be lotted together. In the case of variable length material parts, e.g. photo books, lotting attempts to minimize the percentage of wasted paper in a print run. One method for lotting is described below with reference to FIG. 10. It will be appreciated by those skilled in the art that in order to perform efficient lotting, prepress server 225 must take into account print run efficiency, variable length material parts such as photo book book block, wastage requirements that are established for each material part, and Max_Delay requirements defined per partner for each line item.

Lotter 870 takes into account the imposition requirement for the type of material part that is being lotted. Imposition is the process of intelligently arranging surfaces on a sheet of paper. Imposition is desirable because printing presses typically print multiple pages on a single large sheet of paper to make the most efficient use of the paper and to shorten the time required for printing. Imposition ensures that after the sheets of paper are printed, folded and trimmed, the resulting pages will be in the proper order. For example, in one embodiment greeting cards are printed "4-up." This means that four greeting card surfaces are printed on a single sheet of paper by the printer.

A print-ready generator 880 takes as input all the print-ready files (one per surface) for a lot and the job control files for the lot, and produces as output a single print-ready file and one or more job control files. If the raster image processor (RIP) that will subsequently be used to process this print job is capable of interpreting and processing embedded OPI commands then print-ready generator 880 continues to embed OPI comments. However, not all RIPs are capable of processing embedded OPI comments; if that is the case, then print-ready generator 880 incorporates the composite images stored in data storage 235 into the print-ready file. Raster image processing is discussed in greater detail with reference to FIG. 11.

TABLE 4, below, summarizes the processing required for one lot of ten calendars

TABLE 4

Example of processing required for one lot of ten calendars

| Process | Print-ready file processing | Job control file processing |
|---|---|---|
| Print-ready maker | Creates 1 print-ready file per calendar surface. There are 12 double sided pages (one for each month) + 1 double sided cover page in a calendar. Hence, 13 double sided pages × 2 files per page = 26 print-ready files per calendar. | Creates 1 job control file per calendar; thus creates 10 job control files. |
| Lotter | Lots 10 calendars together., Creates 26 × 10 = 260 print-ready files per lot. | Combines 2 calendars per page to take into account 2 UP imposition; thus creates 5 new job control files. |
| Print-ready generator | Creates a single print ready file (from the 260). | Combines the 5 job control files into a single job control file for the entire print job. Also, creates two additional job control files: (1) describes the imposition of two calendars onto a single page, and (2) provides additional details such as what color management profile to use and whether the print run is simplex or duplex. |

Figure 9A:
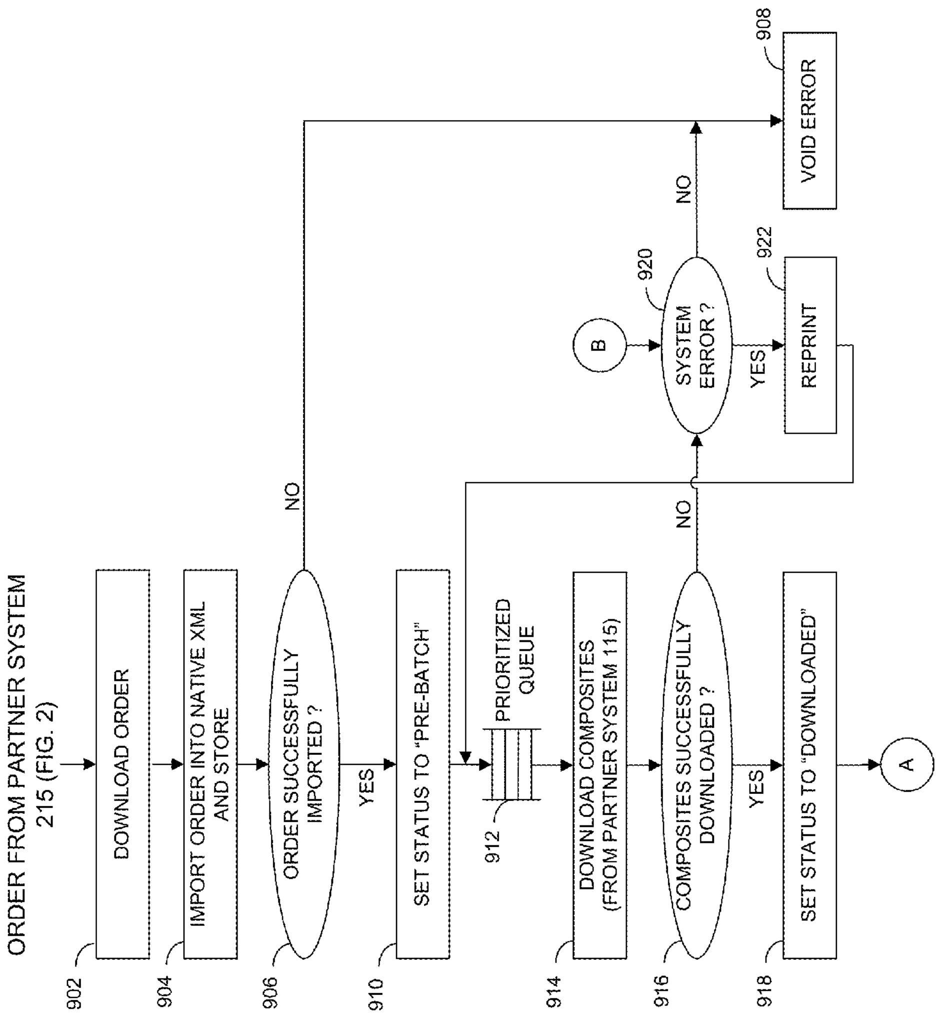
FIG. 9A is a flow diagram illustrating the initial processing steps performed by a prepress server, in accordance with an embodiment of the subject invention.

Reference is now made to FIG. 9A, which is a flow diagram illustrating the initial processing steps performed by a prepress server, in accordance with an embodiment of the subject invention. At Step 902, order puller 810 downloads an order from partner system 215 (FIG. 2). The order is initially assigned a state of "Pending-Order-Import" which signifies that the order has been downloaded but has not yet been processed. At Step 904, order importer 820 performs two tasks: (1) it transforms the order into the native XML format of the printing system and stores it in data storage 235; and (2) it stores the XML attributes of the order in a relational database within data storage 235 according to a pre-defined schema.

At Step 906 a determination is made as to whether the order was successfully imported. If no errors are detected, then the order is determined to have been successfully imported and at Step 910 the order state is set to "Pre-batch." The Pre-batch state signifies that the order has been successfully imported and stored.

If at Step 906 an error was detected, then at Step 908 the state of the order is set to "Pre-Order-Import-Error" which signifies that the order will not be processed any further. Partner system 215 can resubmit the order at its option.

At Step 912, the order enters the prioritized queue for the "Pre-batch" state. At Step 914 image puller 830 selects the first work item in the prioritized queue to process. The Image puller 830 downloads one or more composite images for each surface in each line item in the order and stores them in storage system 235. At Step 916 a determination is made as to whether the prepress server has successfully downloaded all composites for each line item in the order. If so, then processing continues to Step 918 where the state is set to "Downloaded." If at Step 916 it is determined that one or more composite images was not successfully downloaded then processing continues at Step 920.

At Step 920, a determination is made as to whether the error is due to a system error. System errors include inter alia power failure, disc failure, processor failure, and disc full. Generally, system errors result from hardware or software failures in printing system 200 (FIG. 2). Generally, system errors are quickly detected and corrected by operations staff. Non-system errors generally result from corrupted, incorrect or missing image data. If at Step 920 a system error is detected then at Step 922 the state is set to Reprint and the order is then returned to the prioritized queue at Step 912 and subsequently, another attempt will be made to process the order. If at Step 920 a non-system error is detected then the order cannot be successfully processed and control moves to Step 908 where, as previously described, the order is voided.

Figure 9B:
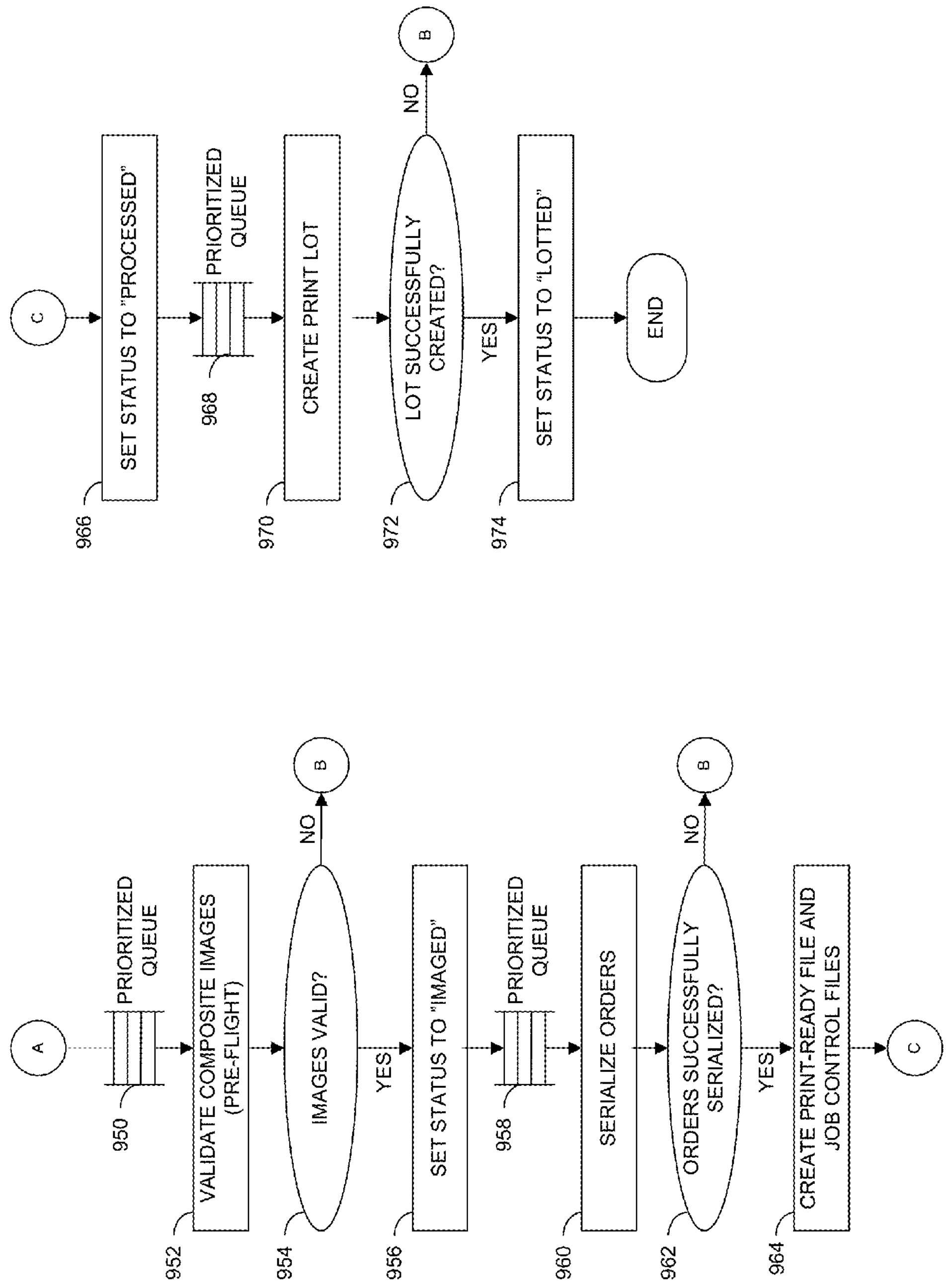
FIG. 9B is a flow diagram illustrating the final processing steps performed by a prepress server, in accordance with an embodiment of the subject invention.

Reference is now made to FIG. 9B, which is a flow diagram illustrating the final processing steps performed by a prepress server, in accordance with an embodiment of the subject invention. At Step 950 the order now enters the prioritized queue for the "Downloaded" state. At Step 952 pre-flighter 840 validates all composite images for one line item. Additionally, if multiple composite images are included in a single file, pre-flighter 840 extracts each image to a separate file.

At Step 954, if all the downloaded composite images in the order are determined to be valid, then at Step 956 the state is set to "Imaged." Once the order has been imaged, all parts of the order including its XML specification and image content have been verified and stored in data storage 235. In one embodiment, the "contractual clock" starts relative to the Max_Delay requirement. In another embodiment, receipt of the order may trigger the "contractual clock." In yet other embodiments, the "contractual clock" is configurable and may be configured for each partner system 215 as stipulated in an applicable SLA. If, at Step 954, it is determined that any of the composite image are not valid then processing continues at Step 920.

At Step 958, the order enters the prioritized queue for the "Imaged" state. At Step 960 order serializer 850 selects the first work item in the prioritized queue to process. Order serializer 850 serializes the order into one or more new serial items each of which consists of a single material part. In may be appreciated by one skilled in the art that serialization of printable parts facilitates high granularity of traceability through the manufacturing process and also facilitates partial shipment of finished goods where earlier delivery of partial orders is preferable to completing and shipping the order in its entirety.

At Step 962 a determination is made as to whether the order was successfully serialized. If it is determined that the order was not successfully serialized then processing continues at Step 920.

At Step 964, for each material part in the order, print-ready maker 860 takes the composite image(s) that corresponds to the material part as input and produces a print-ready file and a job control files as output. The print-ready file and the job control file(s) are used subsequently by the RIP and printing service.

At Step 966 the state of the order is set to "Processed." For purposes of clarity is should be noted that at the "Processed" state each work item references one serial item or material part. Then, at Step 968 the order enters the prioritized queue for the "Processed" state. At Step 970, lotter 870 attempts to lot the material part with other material parts waiting in the prioritized queue in order to efficiently use printer resources as previously described. Finally, print-ready generator 880 takes as input the print-ready files (one per surface) and the job control file and produces as output a single print-ready file and one ore more job control files.

If, at Step 972, the print-ready file and the job control files are determined to have been created successfully, then, at Step 974 the prepress server 225 sets the state to "Lotted." If an error occurs during creation of either the print ready file or the job control file, then control is transferred to Step 920.

Figure 10:
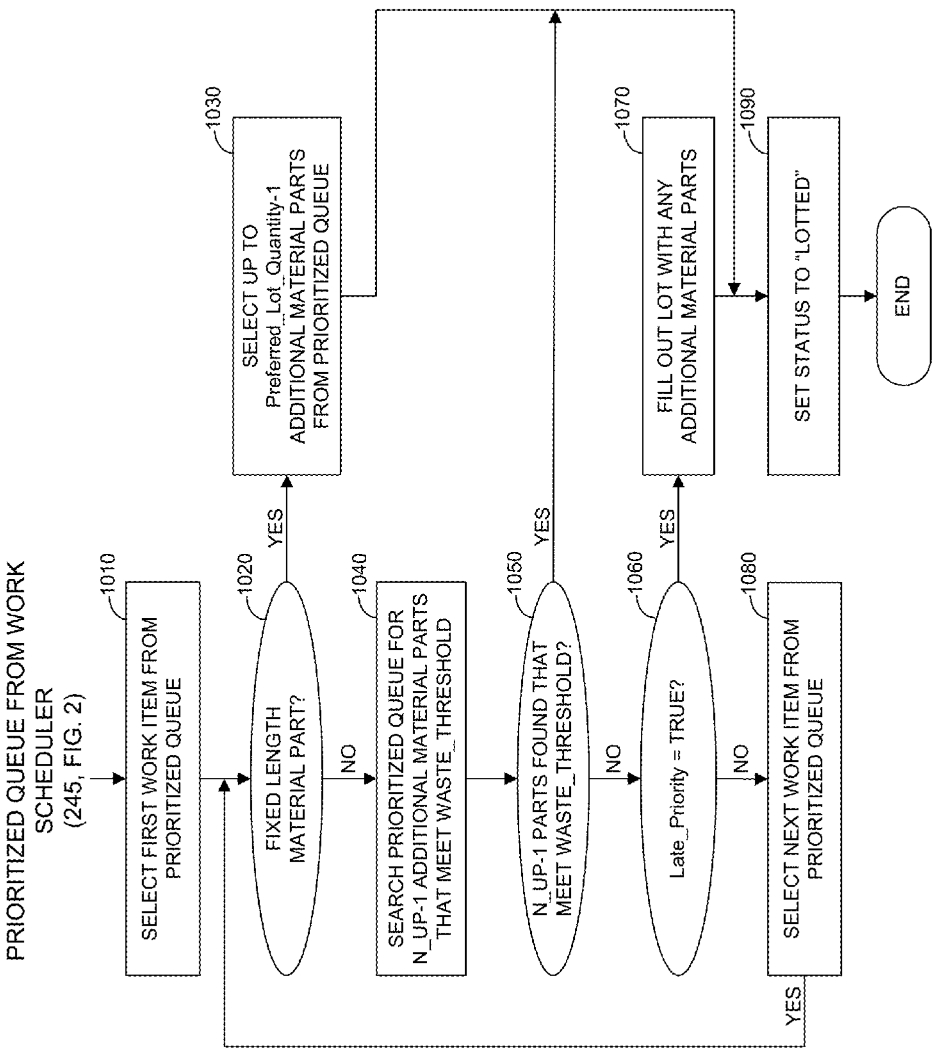
FIG. 10 is a flow diagram that illustrates the processing steps performed by a prepress server to select material parts for a print lot, in accordance with an embodiment of the subject invention.

Now reference is made to FIG. 10, which is a flow diagram that illustrates the processing steps performed by lotter 870 to select material parts for a print lot, in accordance with an embodiment of the subject invention. The exemplary method described in FIG. 10 attempts to lot together one or more material parts to create one print lot. At Step 1010, lotter 870 selects the first work item from the prioritized queue for the "Processed" state. At Step 1020, lotter 870 determines if the work item to be processed is a fixed length material part. It should be noted that a fixed length material part has a fixed number of pages such as a greeting card or calendar. If the material part is fixed length, then at Step 1030 lotter 870 searches the prioritized queue in priority order and attempts to select up to Preferred_Lot_Quantity −1 additional material parts of the same type where Preferred_Lot_Quantity is the preferred number of material parts of this type to be included in a single lot. Lotter 870 will attempt to select up to Preferred_Lot_Quantity of the same material parts but will accept less. As an example, if Preferred_Lot_Quantity is ten (10) in the case of calendars and lotter 870 has selected a first calendar to lot, then it attempts to include 9 additional calendars in the lot. If only 5 additional calendars are included as work items to be processed in the prioritized queue for the "processed" state then those five calendars together with the first will be lotted together for further processing and then printing. In other words, in the case of lotting fixed length material parts lotter 870 simply lots whatever material parts are currently available in the prioritized queue and doesn't wait for additional material parts to arrive.

If at Step 1020 it is determined that the material part to be processed is not fixed length, i.e. it is variable length, then at Step 1040 lotter 870 searches the prioritized queue in priority order and attempts to select up to N_UP−1 additional material parts of the same type such that taken together the N_UP−1 material parts enable the print lot to meet a Waste Threshold requirement. The term "N_UP" refers to the number of pages that are imposed on a single sheet during printing. For example, the book block of a photo book is a variable length material part that is printed 2 Up. In this case N_UP−1 is one (1); thus at Step 1040 lotter 870 searches the prioritized queue for another photo book book block material part which if selected would enable the two photo book book block material parts to meet said Waste Threshold requirement. A "Waste Threshold" requirement is a pre-established value and is defined as the percentage of pages wasted due to inefficient lotting. Table 5, below, presents an example of how the Waste_Threshold requirement is applied to variable length products. In the example, there are five photo book book block material parts awaiting lotting. The algorithm first selects the #1 position material part and then attempts to find a second material part that would enable the two material parts to meet meets the Waste_Threshold requirement. If the Waste_Threshold requirement is set to 10%, meaning that the target is to waste less than 10 percent of the pages, then material part in the eighth position would be selected to fill the lot as 21 sheets of paper will be required to print the two photo book book block material parts and each of the sheets of paper except for the last include two surfaces. The last sheet will include only one surface. Thus the page wastage is only 0.5*1/21=2.4%. However, if the Waste_Threshold requirement is set to 15% then the material part in the fifth position, that is 16 pages long would be selected, because of the 20 paper sheets required for printing 5 would have a single surface and the paper wastage would be 0.5*5/20=12.5%.

TABLE 5

Example Of Variable Length Lotting

| Position in Prioritized Queue | Number of Book Block Pages |
|---|---|
| 1 | 20 |
| 3 | 10 |
| 5 | 15 |
| 8 | 21 |
| 12 | 8 |

At Step 1050 a determination is made as to whether N_UP−1 material parts were selected for lotting that meet the Waste_Threshold. If so then lotting has been successful and processing continues at Step 1090. If not, then at Step 1060 a determination is made as to whether the first work item's Late_Priority attribute is set to True. If Late_Priority is set to TRUE then no further delay can be tolerated and processing continues at Step 1070. At Step 1070 any additional material parts of similar type are included in the lot up to a total lot size of N_UP even if the additional subparts will cause the lot to exceed the Waste_Threshold. After completing the lot processing continues at Step 1090.

If at Step 1060 the Late_Priority attribute for the work item is not TRUE, i.e. it is FALSE, then the lot has not been completed and processing proceeds at Step 1080. At Step 1080 the next work item in the prioritized queue is selected and processing returns to Step 1020. If the last work item in the prioritized queue is reached then processing begins again with the first item. At Step 1090 the state of the work item is set to "Lotted."

Figure 11:
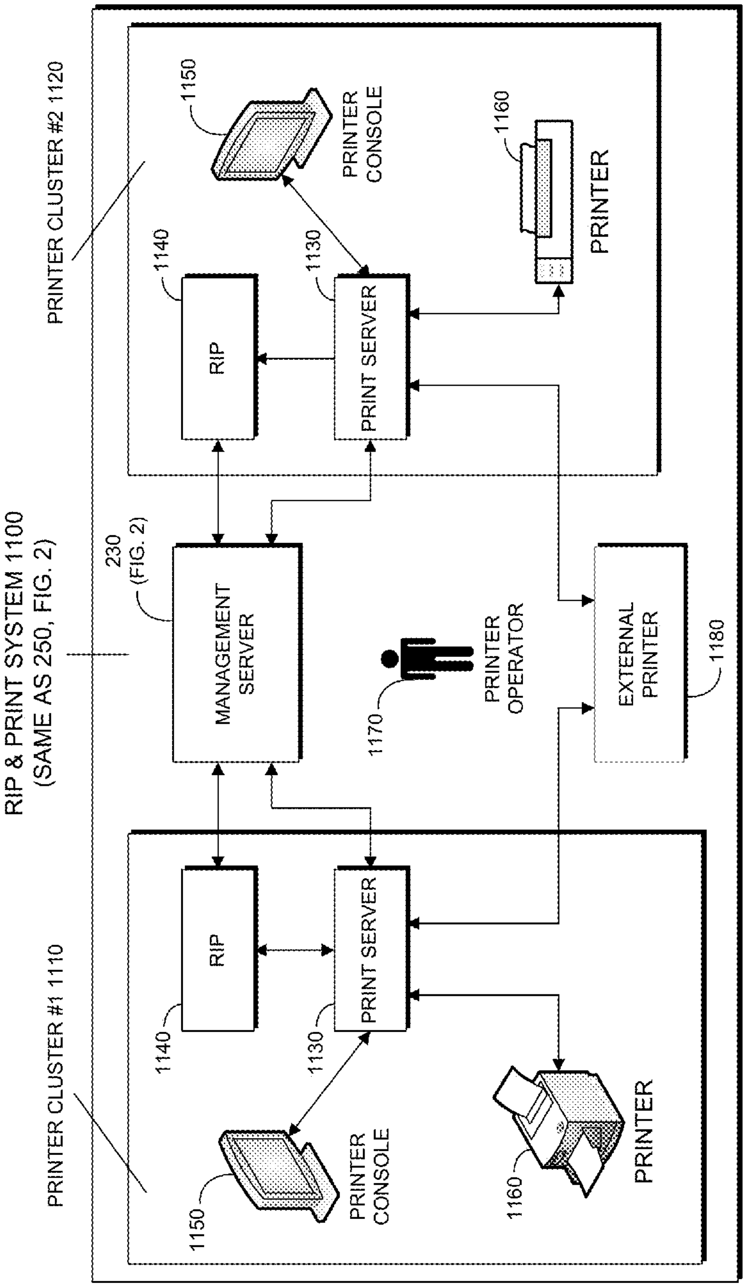
FIG. 11 is a simplified block diagram of a RIP and print system, in accordance with an embodiment of the subject invention.
Figure 12:
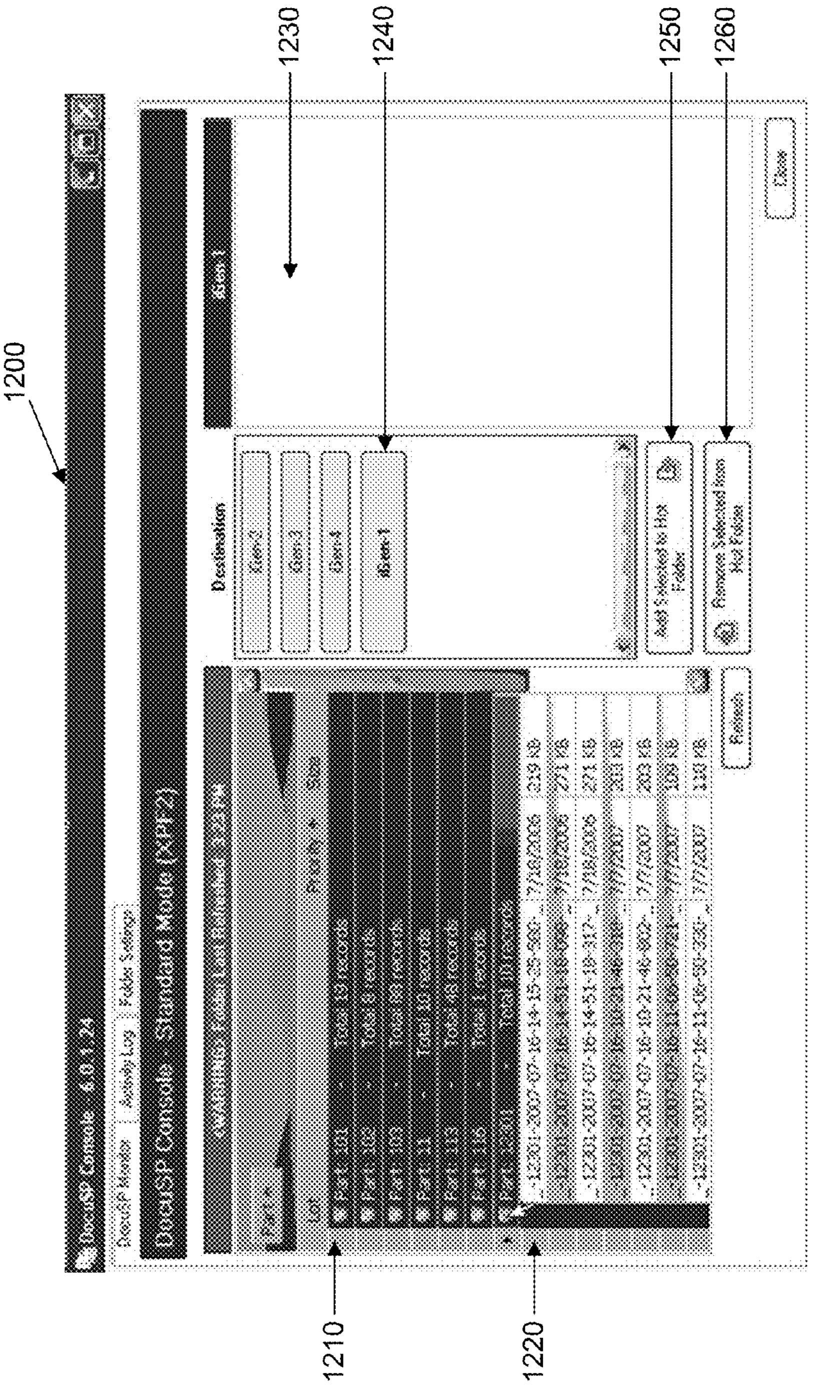
FIG. 12 is an illustrative screen capture from a printer console, in accordance with an embodiment of the subject invention.

Now reference is made to FIG. 11 which is a simplified block diagram of a RIP and print system 1100, in accordance with an embodiment of the subject invention. Two printer clusters are illustrated, a printer cluster #1 1110 and a printer cluster #2 1120. Each printer cluster includes a print server 1130, a raster image processor (RIP) 1140, a printer console 1150 and a printer 1160. In a RIP and printing system there is typically one such cluster for each type of printer and there are typically a plurality of different types of printers. Further a printer cluster may include a plurality of printers 1160 of the same type. Vendors of commercial quality printers include HP, XEROX, and Kodak. Typically, a commercial quality printer requires a RIP 1140 designed specifically for said commercial quality printer. It will be appreciated by those skilled in the art that print server 1130 may be a separate computer system, a card running inside a server computer, or it may be configured as software or hardware inside of prepress server 225, management server 230, or a finishing server 1305 (FIG. 12). Similarly, it will be appreciated by those skilled in the art that RIP 1140 may be a separate computer system, a card running inside a server computer, may be internal to a printer or digital press, or it may be configured as software or hardware inside of prepress server 225, management server 230, or a finishing server 1305.

Print server 1130 periodically reviews the prioritized queue of work items for the "Lotted" state provided by work scheduler 245 (FIG. 2). Print server 1130 selects the highest priority work item that needs to be raster image processed (commonly referred to as being "ripped" or "rasterized") and transfers the print-ready file and job control file for the work item to RIP 1140. Print server 1130 then changes the work item state to "Imported."

RIP #1 1120 receives a print-ready file and a job control file as input. If the print-ready file embeds OPI comments to reference high resolution composite images, then RIP 1140 replaces the OPI comments with the composite images stored in data storage 235 (FIG. 2) during raster image processing. When RIP 1140 completes raster image processing the print job, print server 1130 updates the work item state to "Ready-to-print." RIP 1140 stores the rasterized print data in data storage 235.

Print server 1130 displays the prioritized queue for the "Ready-to-Print" state produced by work scheduler 245 on printer console 1150. The prioritized queue includes work items whose state may be: Lotted, Imported, Ready-to-Print, Imported-to-Press, or Printed.

A human printer operator 1170 uses printer console 1150 to perform a plurality of functions including selecting and initiating the next work item (commonly referred to as a "print job" while it is being processed by RIP and print system 1100) on printer 1160. Prior to starting the next work item, printer operator 1170 may have to inter alia load additional paper, load a new type of paper, or add ink. Once printer operator 1170 selects and initiates a work item, print server 1130 moves the rasterized print data from data storage 235 to printer 1160. Print server 1130 then updates the work item state to "Imported to Press." Once the print job successfully prints, print server 1130 updates the job status to "Printed."

In one embodiment, printer operator 1170 can select a print job to be printed by an external printer 1180. For purposes of clarity, the term external printer refers to a printing press or printing service that operates at a physically remote location. The printing press or printing service may be managed by the same organization that manages printing service 200 or it may be managed by a distinct organization or entity. The operator selects a work item whose status is Ready-to-Print and selects an external printer to perform the printing. The rasterized data file(s) for the work item is transferred either across a network or are written onto removable storage media and then transferred to external printer 1160. Removable storage media includes inter alia USB drive, DVD-RW, DVD-ROM, CD-RW, CD-ROM and external hard drive. The work item is printed off-site by external printer 1160 and the printed materials are then transported back to printing system 200. When a work item is printed by an external printer 1160 the printed work item itself is scan-verified using a hand-held scanner, also referred to as a bar scanner, 1330 to signal that the work item has completed and to change the job status to "Printed." Scan-verification is described with reference to FIG. 13) The print job can be scan-verified by the external printer, in which case a message is generated and sent electronically to print server 1130 or it can be scan-verified by a shop floor operator 1350 after the print job is received. Shop floor operator 1350 is described with reference to FIG. 13. Once the print job successfully and has been scanned, print server 1130 updates the job status to "Printed."

Reference is now made to FIG. 12, which is an illustrative a printer console screen or user interface, in accordance with an embodiment of the subject invention. A printer console screen 1200 enables printer operator 1170 to interactively control the flow of print jobs to one or more printers 1160. There is a unique printer console 1150 for each type of printer. Typically, thus one printer console 1150 may control the flow of print jobs to several printers 1160 of the same type. On the left side of printer console screen 1200, an "awaiting print" window 1210 displays each work item which has "Ready-to-Print" status and is thus ready to be printed. The work items, or print jobs as they are commonly referred to, are lotted material parts that have been rasterized by RIP 1140 and which are stored on data storage 235. Awaiting print window 1210 displays a part number for each type of material part awaiting printing and the number of waiting print jobs for each said type of material part. It should be noted that the label "Part" that appears in awaiting print window 1210 is an abbreviation for the previously defined term "material part". When a Part is expanded, as shown in 1220, the material part serial number, shop priority date and size are listed for each work item in the list.

A "hot folder" window 1230, entitled "iGen-1", displays each print job that has moved by printer operator 1170 from awaiting print window 1210 to hot folder window 1230. Print jobs in hot folder window 1230 will be printed on the currently selected printer. In this example, the currently selected printer is iGen-1 as indicated by an enabled printer button 1240. In this example, printer console screen 1200 controls four printers of the same type: iGen-1, iGen-2, iGen-3, and iGen-4. Printer operator 1170 can drag or more print jobs from awaiting print window 1210 into hot folder window 1230 to initiate printing of print jobs. Alternatively, printer operator 1170 can select one or more print jobs listed in awaiting print window 1210 and then click an "Add Selected to Hot Folder" button 1250 to initiate printing of print jobs. Printer operator 1170 can select print jobs listed in hot folder window 1230 and click on "Remove Selected from Hot Folder" button 1260 to remove print jobs from the hot folder window 120 and place them back in the awaiting print window 1210.

Figure 13:
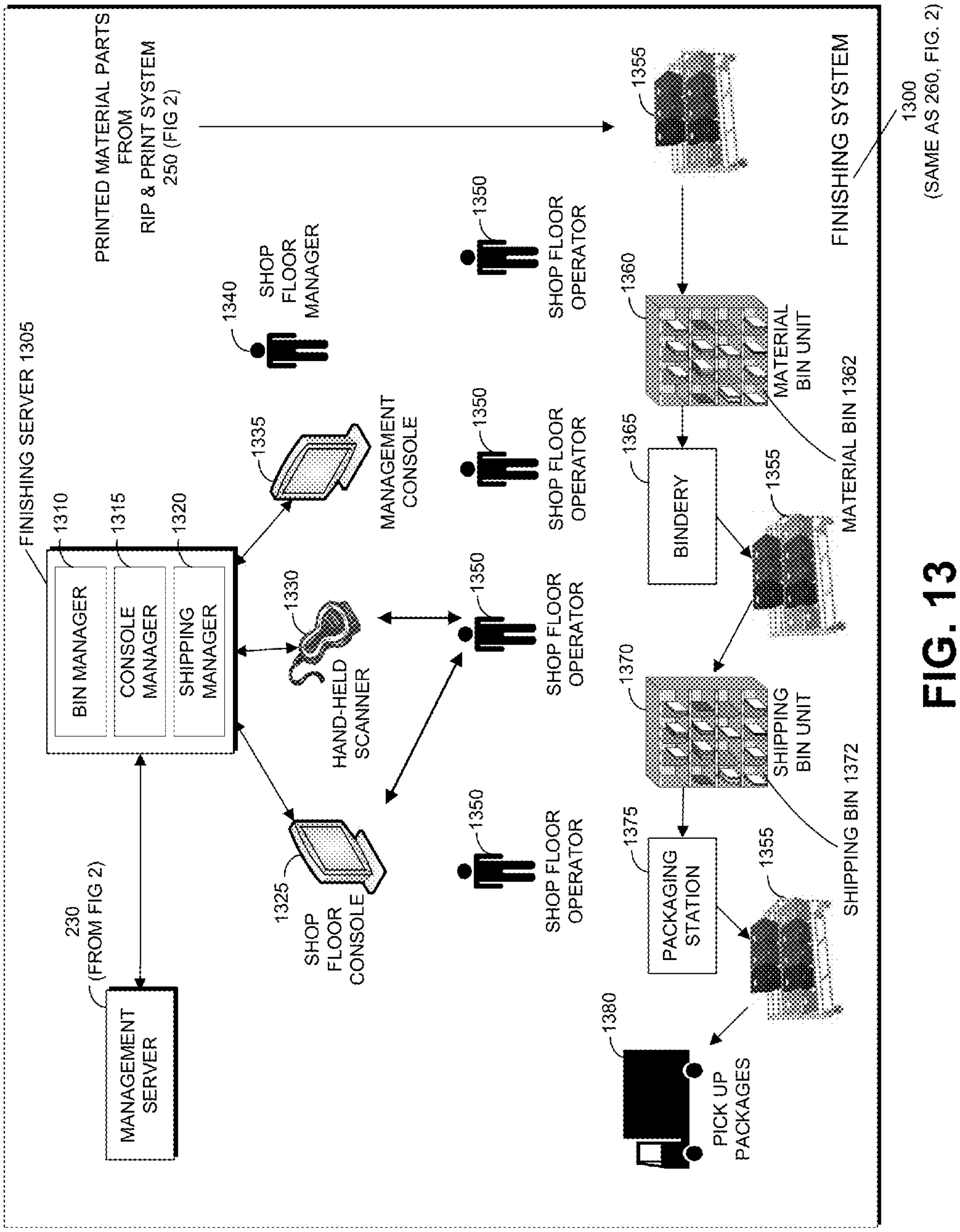
FIG. 13 is a simplified block diagram of a finishing system, in accordance with an embodiment of the subject invention.

Reference is now made to FIG. 13, which is a simplified block diagram of a finishing system 1300, in accordance with an embodiment of the subject invention. Finishing system 1300 takes printed parts from the RIP and print system 250 (FIG. 2) and binds them into completed products, packages them and ships them to recipients to fulfill orders received from partner system 215 (FIG. 2). Two types of human staff or workers are employed in finishing system 1300. A shop floor manager 1340 utilizes a management console 1335 to manage the flow of tasks and a shop floor operator 1350 performs sorting, binding, and packaging tasks. A finishing server 1305 exchanges status information with management server 230 and interacts with shop floor manager 1340 via a management console 1335, and with shop floor operator 1350 via a shop floor console 1325 and via hand-held scanner 1330. Hand-held scanner 1330 can be wirelessly connected to finishing server 1305, or it can be connected by a hard-wired communications line.

Finishing server 1305 three processing modules. A bin manager 1310 manages the sorting of printed parts into and out of material bin 1362 by shop floor operator 1350. A console manager 1315 manages the flow of messages to and from shop floor console 1325, hand held scanner 1330 and management console 1335. A shipping manager 1320 generates a packing slip and a mailing label for each package.

It will be appreciated by those skilled in the art that finishing server 1305 may be a separate computer system; or alternatively finishing server software modules, bin manager 1310, console manager 1315 and shipping manager may be configured to run inside of management server 230, prepress server 225 or print server 1110. It will be further appreciated that finishing server 1305 may be several computer systems, each configured to run one or more processes or handle a certain number of jobs. For example, one finishing server 1305 may run bin manager 1310 and shipping manager 1320, while another finishing server 1305 runs console manager 1315.

Once material parts have been printed by RIP and printing system 250 (FIG. 2), they are transported by shop floor operator 1350 using a tote 1355 near to a material bin unit 1360 on the shop floor. For purposes of simplicity, the term "tote" refers to a container of known size used to transport physical items such as material parts, bound products, and packaged products from one location within finishing system 1300 physical premise to another. Typically, one or more totes are placed onto a cart which has wheels and which can be conveniently pushed across finishing system 1300 physical premise. For purposes of clarity, the finishing system 1300 physical premise is referred to as the "shop floor."

A material bin unit 1360 is a temporary storage unit that is constructed from inter alia wood, metal or plastic that is divided into a plurality of material bins 1362, each having a designated height, width and depth. In addition, each material bin 1362 displays a unique bin number, both in numeric format and in bar code format so that it can be conveniently scanned using hand-held scanner 1330. In one embodiment material bins 1362 are of different sizes, e.g. 1 inch, two inches, and three inches wide.

Shop floor operator 1350 performs material sorting, which is also known as collating. Before starting to sort materials into material bins 1360, shop floor operator 1350 signs in to finishing server 1305. To sign in, shop floor operator 1350 uses either hand-held scanner 1330 or shop floor console 1325 to provide his operator id, and to identify his location on the shop floor. After signing in, shop floor operator 1350 may perform material sorting.

Figure 14:
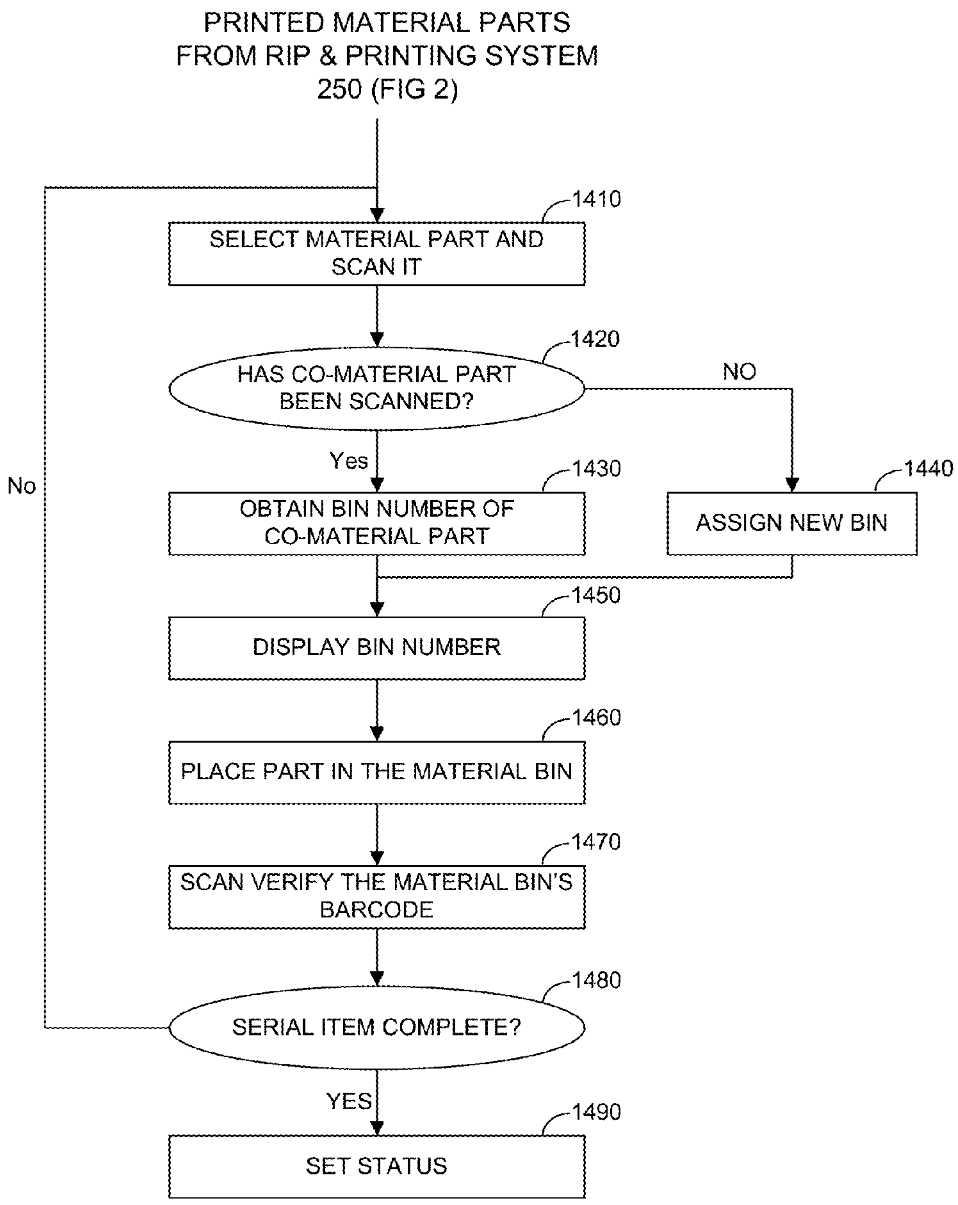
FIG. 14 is a simplified flow diagram that illustrates the steps performed in material sorting, in accordance with an embodiment of the subject invention.

Now reference is made to FIG. 14, a simplified flow diagram that illustrates the steps performed in material sorting, in accordance with an embodiment of the subject invention. At Step 1410 shop floor operator 1350 selects a material part from tote 1355 and scans it using hand-held scanner 1330.

Hand-held scanner 1330 scans the bar code printed on the material part and transmits this information to console manager 1315. At Step 1420 a determination is made as to whether a co-material part has already been scanned. A "co-material part" refers to one of the material parts that makes up a serial item. For a serial item to be complete and ready for binding, all of its co-material parts must be placed by shop floor operator 1350 into the same material bin 1362. For example, if a photo book cover is in a material bin 1362, there is a corresponding book block co-material part because a photo book cover and its corresponding book block are required for the complete photo book serial item to be bound. If a co-material part has already been scanned, then, at Step 1430, bin manager 1310 obtains the bin number that the first co-material part was placed into by shop floor operator 1350.

If no co-material part has yet been received, then, at Step 1440, a new material bin 1362 is assigned by bin manager 1310. Bin manager 1310 takes into account the size requirement of the serial item material parts when assigning a material bin. In one embodiment, there are a plurality of bin sizes, e.g. 1 inch, 2 inches, and 3 inches; and bin manager 1310 takes into account the sizes of all available bins in selecting the bin size that will afford the tightest fit. It will be appreciated by one skilled in the art that achieving the tightest fit minimizes the amount of bin space required and maximizes the amount of work that can be simultaneously printed, binned, and assembled. For variable size material parts, such as the book block of a photo book, bin manager 1310 computes the size of the part by taking into account the page count. In one embodiment, if there are multiple bins of the correct size available, bin manager 1310 selects a bin where the adjacent bins are not currently storing parts in order to reduce the possibility of accidental mistakes by shop floor operator 1350 such as placing a material part into the wrong material bin 1362.

At Step 1450, bin manager 1310 provides console manager 1315 the number of the material bin assigned to the serial item and console manager 1315 displays said material bin number on hand-held scanner 1330. At Step 1460, shop floor operator 1350 places the part into the material bin 1362 that corresponds to said material bin number.

At Step 1470, shop floor operator 1350 uses hand-held scanner 1330 to scan-verify the bar code for said material bin 1362 to indicate that the material part was successfully placed into the correct material bin 1362. The action of scanning a bin's barcode into which the operator just placed, or withdrew an item is referred to as "scan-verifying." At Step 1480, after receiving the scanned bin number via console manager 1315, bin manager 1310 determines whether material sorting of the serial item is complete, i.e. whether all of its component material parts have been placed into material bin 1362. If material sorting is determined to be complete then, at Step 1490, bin manager 1310 updates the job status to "Bindery." At this point, the serial item has been successfully sorted and is ready to be processed in a bindery 1365. If not all co-material parts have been placed into material bin 1362, then additional parts will have to arrive and be material sorted in order to complete material sorting of the serial item and send it to bindery 1365.

In one embodiment, after shop floor operator 1350 places the last co-material part into material bin 1362 hand-held scanner 1330 beeps to indicate that all co-material parts have been placed into material bin 1362.

Referring back to FIG. 13, once a serial item has been material sorted then the serial item can enter bindery 1365. Bindery 1365 is a location, including staff and equipment, on the shop floor where binding is performed. The term "binding", refers to actions that are performed on material parts of a serial item to create a finished product. Said actions include inter alia gluing, stapling, folding, cutting and sewing. For example, if the material parts consist of a cover and book block, then these will have to be glued, stapled or otherwise attached in the bindery. Note that some serial items, including greeting cards and calendars, have only one material part. In such cases, bindery actions such as folding may still be necessary. In some cases, for example with certain types of greeting cards, no bindery actions at all are required. In such cases material sorting is not required and the tote carrying the printed material part will bypass the bindery and be moved to the area on the shop floor where the material part will be ship sorted into a shipping bin 1372.

In bindery 1365, shop floor operator clicks a "Find Next" button on hand-held scanner 1330 and bin manager 1310 retrieves the first work item from the appropriate prioritized queue. Hand-held scanner 1330 displays the number of the material bin 1362 that holds the material parts to bind. Shop floor operator takes the material parts out of the indicated material bin 1360 and scan-verifies each material part by scanning the bar code that has been printed and is visible on the material part. After the last material part has been scan verified, bin manager 1310 releases the material bin for subsequent use. Hand-held scanner 1330 then indicates any non-printed material parts, e.g. a velum separator sheet or a non-printed book cover, to be bound together with the printed material parts. Shop floor operator retrieves any such non-printed material parts which are typically stored within bindery 1365. Shop floor operator 1350 then performs the appropriate binding task on the material parts. Next, shop floor operator 1350 scans the bound serial item and places it into tote 1355. At this point, bin manager 1210 updates the job status to "Bound." When said tote 1355 is full, shop floor operator 1350 moves said tote 1355 near to a shipping bin unit 1370 so that the bound serial items can be "ship sorted."

A shipping bin unit 1370 is a temporary storage unit that is constructed from inter alia wood, metal or plastic that is divided into a plurality of shipping bins 1372, each having a designated height, width and depth. In addition, each shipping bin 1372 displays a unique bin number, both in numeric format and in bar code format so that it can be conveniently scanned using hand-held scanner 1330. In one embodiment shipping bins 1372 are of different sizes, e.g. 1 inch, two inches, and three inches wide.

Shop floor operator 1350 performs ship sorting which is the process of taking individual bound serial items out of tote 1355 and placing them in designated shipping bins 1372. Before starting to ship sort, shop floor operator 1350 signs in to finishing server 1305. To sign in, shop floor operator 1350 uses either hand-held scanner 1330 or shop floor console 1325 to provide his operator id, and to identify his location on the shop floor. After signing in, shop floor operator 1350 may perform ship sorting.

The process of ship sorting is analogous to the process of material sorting. However, in the case of ship sorting, bound serial items are taken from tote 1355 and placed into designated shipping bins 1372 by shop floor operator 1350. A shipping bin holds all serial items that will be packaged together. Ship sorting employs a similar algorithm to that used for material sorting, described with reference to FIG. 14, with three exceptions: (1) rather than placing co-material parts into material bins 1362, shop floor operator 1350 places bound serial items into shipping bins 1372; (2) rather than wait for all co-material parts for the bin to be considered full, the algorithm waits for all serial items that will later be packaged together; and (3) rather than updating the job status to "Bound", bin manager 1310 updates the job status to "Ready-To-Ship." As with material sorting, shop floor operator 1350 withdraws a serial item and scans it. Then, bin manager 1310 uses console manager 1315 to display the shipping bin number into which to place the line item. Next, shop floor operator 1350 places the serial item into the shipping bin 1372 that corresponds to said shipping bin number and scan-verifies the shipping bin. When assigning a shipping bin 1372, bin manager 1310 takes into account the size of all serial items that must fit into the shipping bin.

Once all serial items that will be included in a package have been ship sorted into shipping bins 1372, they are ready to be packaged at a packaging station 1375. Packaging station 1375 is a physical location on the shop floor where packaging is performed.

At packaging station 1375 shop floor operator 1330 clicks a "Find Next" button on shop floor console 1325 and bin manager 1310 retrieves the first work item from the appropriate prioritized queue and displays the number of the shipping bin 1372 that contains the serial items to package. Shop floor operator 1350 takes the serial items out of the indicated shipping bin 1372. Shop floor operator 1250 then scan-verifies said shipping bin 1372 to indicate that the serial items have been taken out and that said shipping bin 1372 is now empty and can be reused. Then bin manager 1310 changes the status of the work item to "Packaged" and (1) selects the appropriate box from a plurality of different types and sizes of boxes, taking into account the size and weight requirements for each serial item to be included in the box, and (2) prints a packaging slip. If the package is to be picked up by a shipping service then a shipping label including postage is also printed. If the package is to be set aside for pickup by a "lab" then a lab label is printed. A lab is a photo lab service or other company for whom packages are batched and shipped together.

Shop floor operator 1350 then uses shop floor console 1325 to determine if any embellishments need to be added to the package. Shop floor operator 1350 retrieves any such needed embellishments which are typically stored near to packaging station 1375.

Shop floor operator 1350 completes the packaging task by (1) pulling the appropriate box as indicated by the packaging screen displayed by shop floor console 1325, (2) placing the serial items, the packaging slip, and packaging material in the box, (3) sealing the box and (4) affixing the shipping label or lab label to the box. Shop floor operator 1350 then places the package into tote 1355 which will be moved to a designated pick up area on the shop floor. At this point, bin manager 1310 updates the work item status to "Shipped."

If an error occurs during packaging an error label is printed and the order remains in the "Packaged" state. In this case, the package and the error label are set aside for shop floor manager 1340. Once shop floor manager 1340 resolves the error he scans the package again to obtain a shipping label, then affixes the label and places the package into the designated tote 1355. Bin manager 1310 then updates the work item status to "Shipped."

In one embodiment, if the package is intended for a lab then a lab label is affixed and the package is placed in a designated tote, referred to as a "lab bin." Periodically, shop floor operator 1350 uses shop floor console 1325 to scan-verify packages from the lab bin and place the packages into a box. When the box is full shop floor operator 1350 uses shop floor console 1325 to indicate to bin manager 1310 that the package is full. Shipping manger 1320 then prints a packing slip and a shipping label. Shop floor operator 1350 places the packing label inside the box, seals the box, and places the shipping label on the box. Shop floor operator 1350 then moves the box to a designated location on the shop floor. Bin manager 1310 then updates status for each of the work items that were placed in the box to "Shipped."

Figure 15:
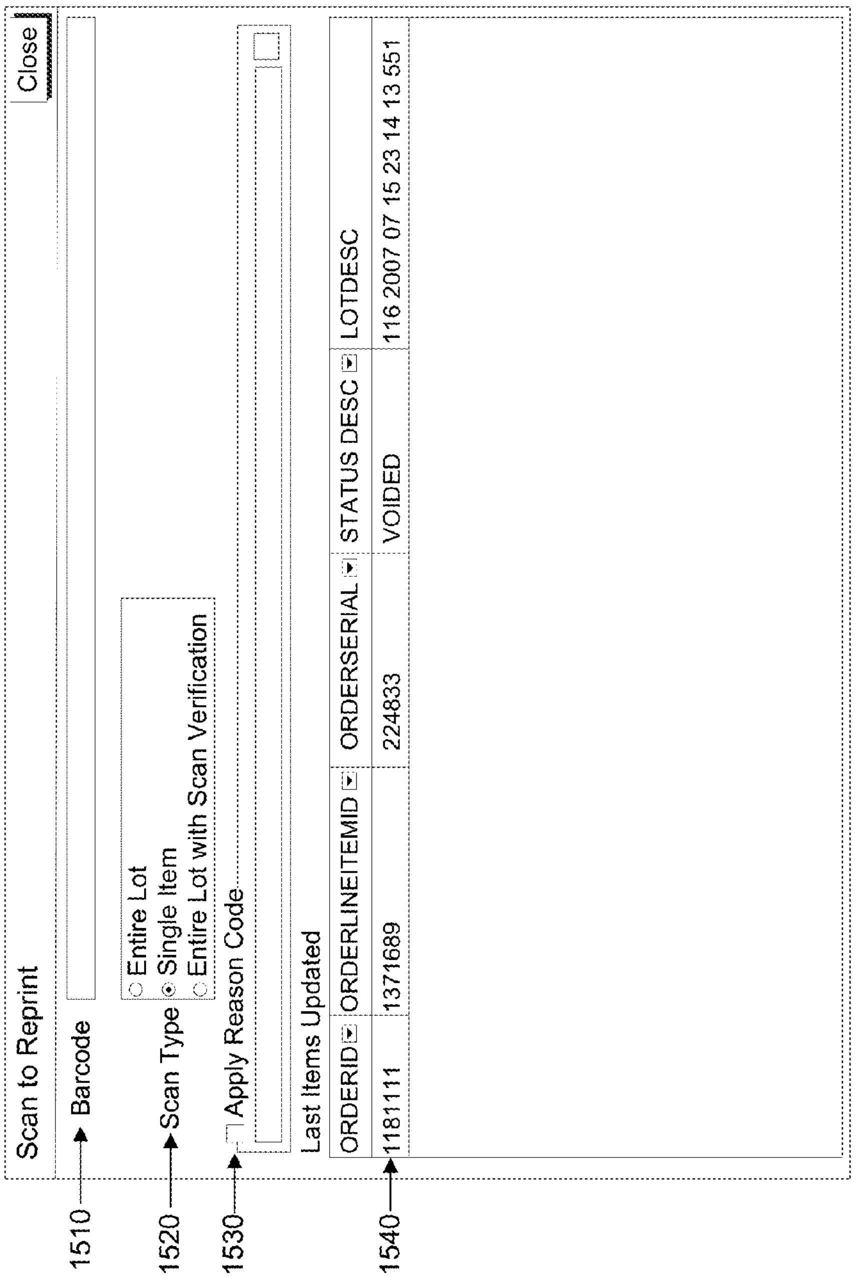
FIG. 15 is an illustrative screen capture from a shop floor console, in accordance with an embodiment of the subject invention.

Now reference is made to FIG. 15. which is an illustrative screen capture from a shop floor console, in accordance with an embodiment of the subject invention. In this example, shop floor operator 1350 selects the operation "Scan to Reprint" and the user interface screen depicted in FIG. 15 appears. Next, shop floor operator 1350 scans the barcode that appears on a serial item to be reprinted. The serial item number appears in a barcode field 1510. Shop floor operator 1350 may use a checkbox 1520 to indicate whether the entire lot, a single serial item or an entire lot with scan verification should be assigned to reprint. Shop floor operator 1350 can check a box 1530 and enter a reason code that indicates the reason why the serial item is to be reprinted. Window 1540 displays a list of previous serial items that were scanned to reprint.

FIGS. 2, 5-11, 13-14, and 16-18 are flowcharts and component diagrams in which each graphical element, including rectangles, cylinders, and triangles, can be implemented by computer program instructions. These program instructions may be provided to a processor and then executed by the processor, thus creating means for implementing the actions represented by the graphical element. The computer program instructions may be executed by a processor to cause a series of operational steps to be performed by the processor to produce a computer-implemented process such that the instructions, which execute on the processor to provide steps for implementing the actions represented by the graphical element. Some of the computer program instructions may be performed in parallel, or across more than one processor, such as might arise in a multiprocessor computer system. In addition, the actions represented by one or more graphical elements may also be performed concurrently with actions represented by other graphical elements, or even in a different sequence than illustrated without departing from the scope or spirit of the invention. It will also be understood that the actions represented by each graphical element and by combinations of graphical elements can be implemented by special purpose hardware based systems that perform the specified actions or steps, or combinations of special purpose hardware and computer instructions.

Universal Ordering Service for Manufacturing Customized Print Products

Figure 16:
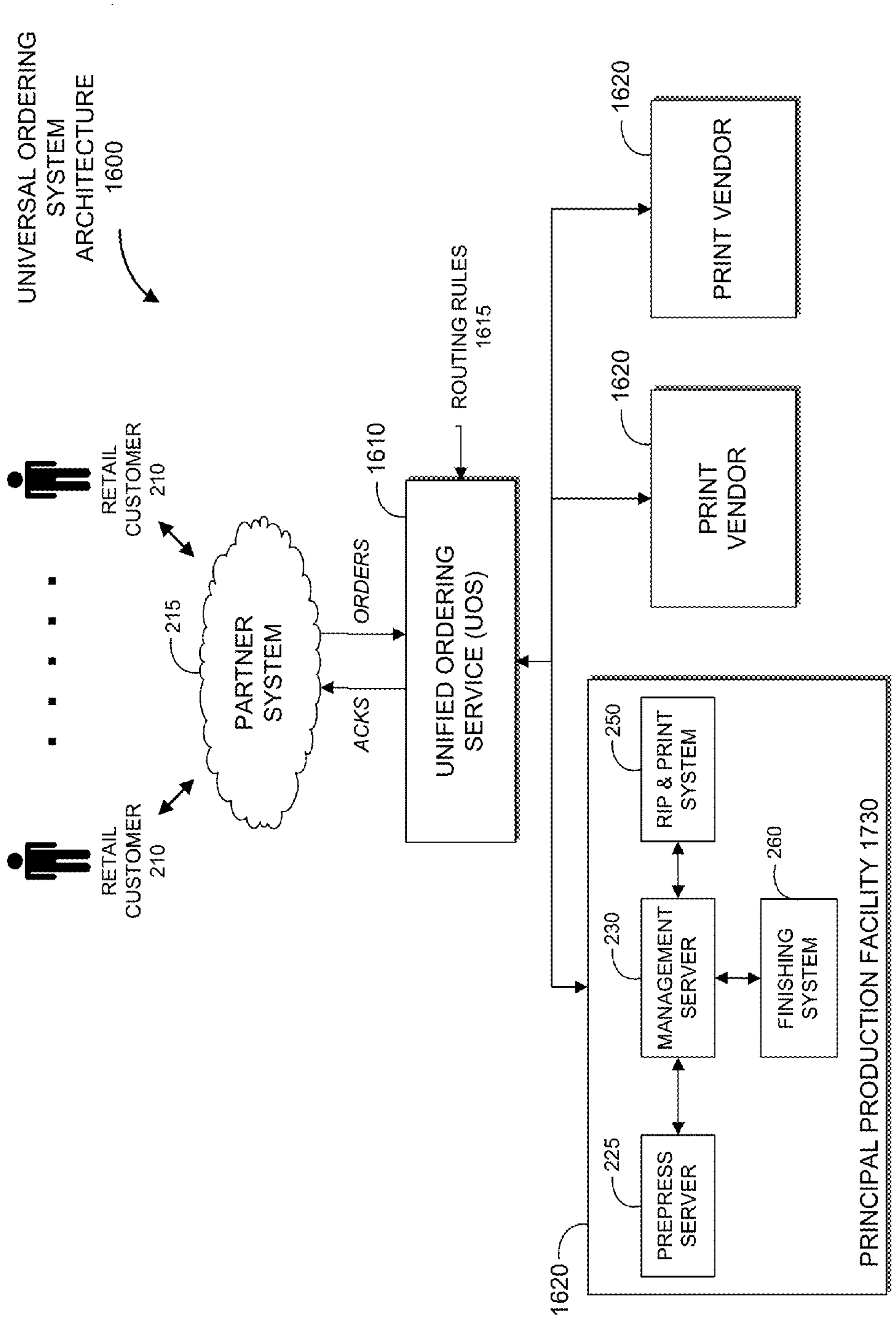
FIG. 16 illustrates an embodiment of a mufti-vendor printing architecture in which orders for customized print products are received by a universal ordering service (UOS) and then distributed to one of a plurality of print vendors for printing and delivery.

FIG. 16 illustrates an embodiment of a mufti-vendor printing architecture in which orders for customized print products are received by a universal ordering service (UOS) and then distributed to one of a plurality of print vendors for printing and delivery. This embodiment decouples the intake of orders with the back-end processes required to print and ship the custom orders, referred to hereinbelow as manufacturing or fulfillment processing. Thus, this embodiment decouples order intake from fulfillment processing by implementing a separate system, referred to as a universal ordering service (UOS) 1610, that receives orders, created by customers 210, from one or more partners 215, performs order processing and then distributes the orders to a plurality of print vendors 1620 that perform fulfillment processing. A principal production facility 1630, a special case of print vendors 1620, is described in detail hereinabove with reference to FIGS. 1-15. UOS 1610 further enables print orders to be processed by print vendors 1620 that may be independently owned and operated from principal production facility 1630 and which may perform fulfillment processing in a different way, using different devices and methods.

As used herein, the term print vendor, or vendor, refers to a production facility that receives an order for a custom print job, manufactures, or prints, the order and ships the order or requests shipping of the order to a customer. More than one print vendor may be operated by the same company or organization. As used herein, the term principal production facility 1630 refers to a special case of a print vendor 1620, which is described with reference to FIGS. 1-15. However, unless otherwise specified herein, from the perspective of UOS 1610, principal production facility 1630 is identical to print vendor 1620. Generally, the types of facilities employed and the method of operation of print vendor 1620 is not known except for the processing details disclosed herein.

In this regard, UOS 1610 works like a railway switchyard. UOS enables any number of partner systems 215 to submit orders on behalf of customers for the manufacture of customized print products. UOS 1610 uses routing rules 1615 to determine optimal routing of orders to print vendors 1620. The business rules that drive the routing can be static—for example, a routing rule based on a product SKU may require that a particular product or SKU be manufactured only by a specific print vendor. Alternatively, another routing rule may require that manufacturing and delivery costs be minimized by producing the goods at a facility in close proximity to the order destination. Routing rules 1615 may also be dynamic. For example, production capacity at a several print vendors 1620 may be overly taxed, putting contractual obligations for delivery at risk. In such cases routing rules 1615 may require that orders be routed for a period of time to a specific fulfillment facility to meet a delivery schedule obligation, despite resulting in a less optimal cost margin.

Figure 17:
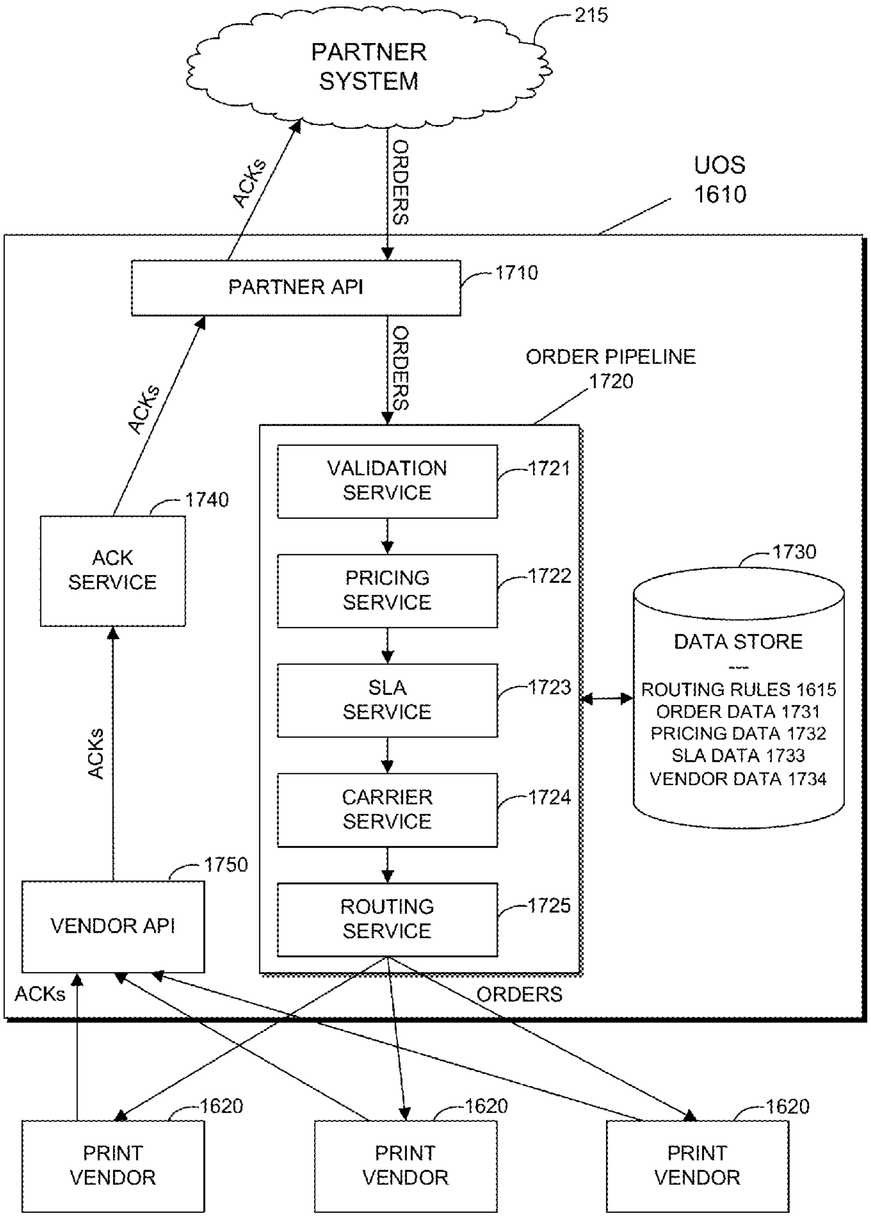
FIG. 17 provides additional detail about one embodiment of universal ordering service (UOS) service.

FIG. 17 provides additional detail about one embodiment of universal ordering service (UOS) service 1610. UOS 1610 receives orders from partner system 215. As previously discussed, partner system 215 represents one or more external sources of orders. Also, as previously discussed, an order has one or more line items, or SKUs.

Partner system 215 uses a partner API 1710 to submit orders as well as to receive a stream of update messages from an acknowledgement (ACK) service 1740. Upon receipt of an order, UOS 1710 stores the order in a data store 1730 as order data 1731.

In one embodiment, partner API 1710 is implemented using a REST architecture in which clients send request messages to servers, servers process the requests and return responses. REST is defined by the W3C technical Architecture Group (TAG) and uses https as a transport mechanism for messages. As used herein, partner API includes the definition of the request and response messages defined between partner system 215 and UOS 1610 as well as the supporting functions performed by UOS 1610 to process the commands defined in the API.

In addition to enabling partner system 215 to submit orders, partner API 1710 provides additional order processing functions including: cancel order, change delivery method, get order info and get orders. Each of these API calls made by partner system 215 results in a code being returned by UOS 1610. For example, return codes for the order submission function include: Order Created Successfully, Bad Request, Not Authorized, and Internal Error.

ACK messages provided by UOS 1610 via partner API 1710 include: order validated, order routed, order accepted, order packaged, reject order, cancel order, report error, and shipping notification. These are used to inform partner system 215 of states of an order. In addition, the Get Order Info API call enables partner system 215 to obtain information from UOS 1610 about an already submitted order. In one embodiment, the message returned by UOS 1610 contains the most recent order status, and if the order has shipped the relevant tracking numbers and ship dates for order shipments. In one embodiment, a Get SKU Info API call enables partner system 215 to obtain analogous information for one or more individual SKUs that are part of a previously placed order.

Partner system 215 submits orders to UOS 1610 via partner API 1710. The order is processed by a series of services, referred to as an order pipeline 1720.

The first service performed by order pipeline 1720 on a newly received order is a validation service 1721, which analyzes the received order to identify potential errors in destination address and compatibility between the indicated shipping method and the destination address. For example, incomplete addresses are identified. Or if shipping is to a post office box but the desired shipper won't deliver to a post office box then an error is generated. Validation service 1721 may validate, or identify, other types of errors in an order. For example, it can validate image formats, sizes and contents supplied for use in products. In one embodiment, if an error is detected during validation then an error message is generated and returned to partner system 215. Generally, error messages, or "ACKS" include information about the error. An error may be a recoverable error that partner system 215 can remedy, for example by fixing a postal code or a state abbreviation. In other embodiments, UOS 1610 attempts to correct the error, for example by requesting updated information from partner system 215. Once an order is validated a status of "Validated" is assigned to the order. This can generate a message to partner system 215 via ACK service 1740.

Validation service 1721 generates a new order that corresponds to the received order. Additional details such as the price, SLA date, shipping service and print vendor to which the order will be routed are determined by the various order pipeline 1720 services at successive steps and are added to the corresponding order. Finally, the corresponding order is routed to a print vendor 1620 for fulfillment processing.

A pricing service 1722 determines the price of an order. In one embodiment, after pricing has been performed price information is added to order data 1731 which can be (1) provided to partner system 215, (2) used to generate an invoice, or for other purposes. If a price can't be generated an error status is assigned to the order and an error message is sent to partner system 215 via ACK service 1740.

Pricing service 1722 calculates the price of an order or SKU based on an existing contract with the particular partner system 215 that issued the order, the shipping method requested, the SKU(s) included in the order, customizations such as the number of pages, and potentially other information supplied as part of the order. Pricing service 1722 relies on pricing rules and pricing data 1732 included in data store 1730. An order may be re-priced by pricing service 1722 at any time. For example, if a pricing change is made, or special holiday pricing is announced it is possible to re-price orders that have been placed and which have already been priced by pricing service 1722 to enable partner system 215 and their customers to take advantage of the new prices.

An SLA service 1723 computes an SLA date for each order based on contracts, or service level agreements (SLAs) between the operator of UOS 1610 and the submitting partner system 215. Analogous to the previously defined Max_Delay parameter that is computed by management server 230 within principal production facility 1720, an SLA date is the latest date and time at which an order can be completed and available for shipment under the service level agreement (SLA) that applies to the order. In the case that UOS 1610 is distributing parts of an order and not just entire orders then SLA service 1723 determines a SLA date for each SKU in the order.

To compute an SLA date, SLA service 1723 accesses contract data extracted from SLAs and stored as SLA data 1733 in data store 1730. The computed SLA date for an order is included with the order prior to its being sent to a print vendor 1620.

A carrier service 1724 determines the optimal carrier, also referred to shipping service, to use in order to meet SLA constraints, i.e. delivery date constraints and cost constraints. Carrier service 1724 maps shipping codes specified in an order from partner system 215 into shipping codes used by UOS 1610. UOS 1610 uses a standard set of shipping codes for communications with print vendors 1620. A ship code specifies both carrier and method of shipment. For example, FDX_GND is the ship code for FEDEX Ground shipping. Partner system 215 may use a different code, but carrier service 1724 translates it to FDX_GN for use in messages exchanged with print vendor 1620.

Sometimes, when dealing with orders, the exact method of shipment is not specified. In these cases, carrier service 1724 will send the print vendor a "Best Way" shipping code with the order. A best way code indicates that the print vendor can choose its own preferred ship method for the shipment so long as the method meets the parameters of the best way request. The print vendor is expected to return the code for the actual ship method used in all shipping acknowledgements.

For example, UOS 1610 receives an order from partner system 215 specifying FedEx Ground as the ship type. Partner system 215 has specified its own code "FG" as the ship code. Carrier service 1724 translates this code as the UOS code "FDX_GND". UOS 1610 then routes the order to Acme Printing, one of print vendors 1620, specifying the ship code as "FDX_GND". Acme printing produces the order and ships it FedEx Ground. Acme returns the code "FDX_GND" in their ship ack. UOS 1610 forwards the ack back to partner system 215, translating the UOS ship code back to the partner system 215 ship code of "FG".

A routing service 1725 routes, or assigns, each order to a print vendor 1620. Once an order is routed a status of "Routed" is assigned to the order. This can generate a status message to partner system 215 via ACK service 1740. In certain embodiments routing service 1725 routes individual SKUs that comprise an order rather than an entire order. Generally, the approach taken to routing SKUs is similar to that described herein for routing orders.

For each order, routing service 1725 determines which of print vendors 1620 are capable of producing, or manufacturing, the order. This determination relies on vendor data 1734 stored in data store 1730 that specifies characteristics of print vendors, including which SKUs each print vendor 1620 is capable of manufacturing. Other characteristics that may be included in vendor data 1734 include geographic location and capacity.

In the case that there are multiple print vendors 1620 capable of manufacturing the SKUs in an order, routing service 1725 may rely on several factors to route an order, including (1) cost, (2) geography, and (3) print vendor capacity. With respect to cost and geography. routing service 1725 determines, based on the geographic locations of the intended recipient of the order and of each of the multiple print vendors 1620 which print vendor can (1) manufacture the part for the lowest cost, including cost of shipping, and (2) meet the SLA date constraint. In other embodiments, routing service 1725 performs a real-time auction by submitting requests for quotes to vendor systems and determines routing based on the best terms proposed in the responses from the vendors. In such auction embodiments, the proposal, offer and acceptance are automated between routing service 1725 and print vendors 1620.

With respect to capacity, routing service 1725 may take into account the capacity of each print vendor 1620 as well as the orders and SKUs that have been recently assigned to each print vendor 1620 in making a routing decision. In yet another embodiment, routing service 1725 is capable of receiving o requesting status updates from one more print vendors 1620 in real-time as to their current availability to receive and process orders. In this embodiment, routing service 1725 then makes a dynamic routing decision based at least in part on the real-time capacity of print vendors 1620.

Generally, routing rules are embodied as declarative business rules or as dynamic rules that optimize for one or more criteria based on information that is updated either in real-time or at least from time-to-time. An example of a declarative rule is: "all cards destined for UK route to the Eindhoven production facility." In addition, to capacity, as described above, other criteria that dynamic rules can optimize for include: cost margin, delivery time and quality. An example of a dynamic routing rule that when evaluated by routing service 1725 selects a print vendor based on the criteria of cost margin and delivery time is:

route based on highest margin if margin>25% else route based on fastest ship time

In the preceding example of dynamic routing the cost margin obtained by selecting a specific print vendor is based on cost data that is updated from-time-to-time and ship time is an estimate of the actual time to manufacture and ship a particular product or SKU that is updated based on analyzing the stream of ACKs from the various print vendors.

Further, if a print vendor 1620 rejects an order then routing service 1725 is capable of rerouting the order to a different print vendor 1620.

For each order, an ACK service 1740 receives a stream of status messages from print vendors 1620 as well as from the various services in order pipeline 1720 regarding the status of the order and relays those messages to the appropriate partner system 215.

A vendor API 1750 enables UOS 1610 to submit orders and issue other commands to a print vendor 1620 and to receive status updates, in the form of messages with predefined status codes. Analogous to partner API 1710, in one embodiment vendor API 1750 is implemented as a REST protocol using https as a transport mechanism. Every API call returns an HTTP response code that indicates the result. XML is used to encode API calls (requests) and response messages.

Commands that may be issued by UOS 1610 using vendor API 1750 include submit order, cancel order, change delivery method (for a previously submitted order), get order info and get orders.

Vendor API 1750 enables print vendors to send status messages, also referred to as acknowledgements (ACKS), that indicate that an order has reached a specific state of order processing. Each state is associated with a specific event. One embodiment of the series of events that may occur while an order is being processed by a print vendor and which are associated with status messages (ACKs) is given below in Table 6.

TABLE 6

| Acknowledgements From Print Vendors | |
|---|---|
| Status or Event | Short Description |
| Order Accepted | When an order has been received and any associated media files for the order have been downloaded and verified, an acknowledgement will be sent to UOS 1610 that the order has been accepted. |
| Order Rejected | If the Vendor cannot process an order, a reject acknowledgement is sent to notify UOS 1610 to send the order to another print location. |
| Order Canceled | If UOS 1610 cancels an order, the vendor uses this ACK to send a cancel acknowledgement to inform UOS 1610 that the cancel has been completed. |
| Order Packaged | When an order has been successfully processed and packaged, an order packaged acknowledgement will be sent to UOS 1610. |
| Order Shipped | When an order has been successfully processed, aggregated and shipped, a shipping acknowledgement will be sent to UOS 1610. If the order is large and must be split into separate shipments, a separate shipping ACK is sent for each shipment. |
| Error | During processing of an order, errors may arise. If the vendor cannot resolve these errors themselves, these errors are be reported to UOS 1610 using an Error acknowledgement. |

In certain embodiments, UOS 1610 is implemented as a single server computer or as a plurality of server computers operating cooperatively, each performing some of UOS 1610 functions. Devices that may operate as a server computer include, but are not limited to, personal computers, desktop computers, multiprocessor systems, microprocessor-based or programmable consumer electronics, network PCs, servers, network appliances, and the like.

In certain embodiments, UOS 1610 is implemented as one or more server computers, where a server computer includes a computer processor (CPU), network interface card for communicating across a network and/or a wireless network, and nonvolatile data storage for storing program code and data.

In another embodiment, UOS 1610 functions are implemented as a software layer that runs inside of principal production facility 1730. For example, UOS 1610 functions may be added to prepress server 225 or management server 230.

In yet other embodiments, UOS 1610 functions may be delivered by cloud service facilities as a service over a network, such as the Internet, rather than by a specific server or cluster of servers.

Generally, the term server computer is used generically to refer to the cases when UOS 1610 is implemented by a single server computer, multiple server computers, principal production facility 1730, or by a cloud service.

Data store 1730 may be implemented by virtually any mechanism usable for storing and managing data, including but not limited to a file, a folder, a document, a web page or an application, such as a database, digital media including digital images and digital video clips, and the like. Data store 1730 may further include a plurality of different data stores or databases. For example, data store 1730 may be implemented as separate SQL databases for routing rules 1615, order data 1731, pricing data 1732, SLA data 1733, and vendor data 1734. Further, data store 1730 may also include network storage or cloud storage in which the physical storage media is accessed across a network.

Figure 18:
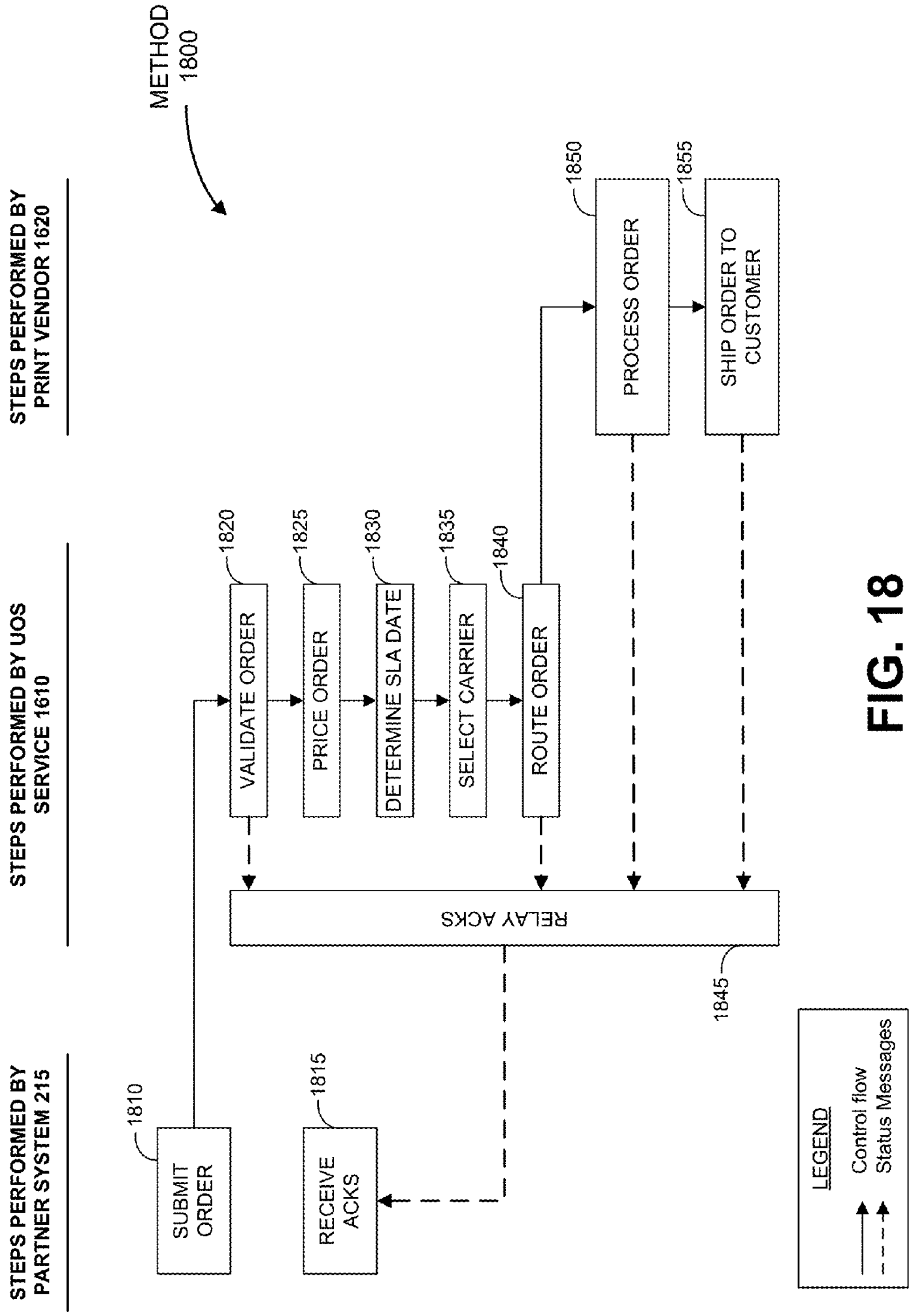
FIG. 18 depicts one embodiment of a method performed by UOS that employs multiple print vendors to print custom print products.

FIG. 18 depicts one embodiment of a method performed by UOS 1610 that employs multiple print vendors 1620 to print custom print products.

At step 1810 a partner system 215 submits an order to UOS 1610, on behalf of a customer, for a custom print product. At step 1820 validation service 1721 validates the order. This step may include performing any completeness and consistency checks on the order and on images and other media elements to be used in manufacturing the custom print product. This step also includes generating a new, corresponding, order that includes information determined as part of the processing performed by order pipeline 1720. Once the order is validated and a corresponding order is generated validation service 1721 generates a status code of Validated for the order and, at step 1845 ACK service 1740 uses partner API 1710 to inform partner system 215 of the updated status.

Generally, messages that correspond to the various status codes associated with order processing flow from UOS 1610 and from print vendor 1620 via UOS 1610 to partner system 215. At step 1815 partner system 215 uses partner API 1710 to obtain or receive the status messages which may be batched or may be obtained individually.

At step 1825 pricing service 1722 prices the order. At step 1830 SLA service 1723 determines the SLA date for the order. At step 1835, carrier service 1724 selects a carrier, or shipping service, to ship the order once it is manufactured. At step 1840 routing service 1725 selects a print vendor 1620 to fulfill or manufacture the product(s) in the order. Also, at step 1840, routing service 1725 uses vendor API 1750 to submit the order to the selected print vendor 1620.

At step 1850 selected print vendor 1620 processes the order. At designated processing steps selected print vendor 1620 uses vendor API 1750 to send status updates. Upon successful completion of the processing, selected print vendor 1620 notifies the selected carrier that the print product(s) included in the order are available. Subsequently the carrier picks up and delivers the custom manufactured product(s) to the customer. Once the carrier picks up the customer print product(s) selected print vendor 1620 uses vendor API 1750 to send a status message to UOS 1610 that the order has shipped. UOS 1610 in turn relays the message to partner system 215 thus completing the order.

It may be appreciated by one skilled in the art that the methods, processes, and architecture implemented by UOS 1610 may be applied to any type of custom manufacturing and is not limited only the custom manufacturing of print products. For example, the method may be applied to other manufactured goods such as vehicles, music CDs or other items that contain a custom selection of music, other media including video and film, home furnishings, and items of clothing.

LISTING 1

```
<?xml version="1.0" encoding="ISO-8859-1"?>
<Order xmlns="http://www.ipads.com/xml/iPads_Order"
xmlns:xsi="http://www.w3.org/2001/XMLSchema-instance"
CustomerID="Partner_Brand" EnvelopeID="33809" OrderID="33809"
orderDate="2007-02-12"
xsi:schemaLocation="http://www.ipads.com/xml/iPads_Order
iPads_Order.xsd">
  <Address AddressID="1">
    <firstname>Mark</firstname>
    <lastname>Gustafson</lastname>
    <address1>100 EastLake Ave N</address1>
    <address2></address2>
    <address3></address3>
    <city>Seattle</city>
    <state>WA</state>
    <postalcode>98101</postalcode>
    <country>US</country>
    <phone></phone>
    <email>mark@rpiprint.com</email>
  </Address>
  <Contact ContactID="1" AddressID="1" />
```

-continued

LISTING 1

```
  <BillTo BillingID="1" AddressID="1"> <Invoice /> </BillTo>
  <ShipTo AddressID="1">
    <ShipMethod>GROUND</ShipMethod>
    <PackingSlip include="true" />
  </ShipTo>
  <CartItem ContactID="1" description="scenes" quantity="7">
    <PhotoBook__8by10wrap>
      <PhotoBookAttributes/>
        <PhotoBookCover>
          <PhotoBookCoverAttributes>
            <JobName Value="CoverPortrait"/>
            <JobStock
Value="Black__Small__Wrap__Cover__Port__PartnerBrand"/>
          </PhotoBookCoverAttributes>
          <PhotoBookPage PartOrder="1">
            <PhotoBookPageAttributes>
              <TemplateName Value="StandardWrapPortraitCover"/>
            </PhotoBookPageAttributes>
          <Photo>
            <PhotoAttributes>
              <Filename Value="cover__P24786__0002.pdf"/>
              <ImageType Value="pdf"/>
              <ElementName Value="Photo1"/>
              <CropStyle Value="StretchFit"/>
            </PhotoAttributes>
          </Photo>
        </PhotoBookPage>
    </PhotoBookCover>
    <PhotoBookBookBlock>
      <PhotoBookBookBlockAttributes>
        <JobName Value="DuplexPortrait"/>
      </PhotoBookBookBlockAttributes>
      <PhotoBookPage PartOrder="1">
        <PhotoBookPageAttributes>
          <TemplateName Value="StandardPortrait"/>
        </PhotoBookPageAttributes>
        <Photo>
          <PhotoAttributes>
            <Filename Value="page__P24786__0001.pdf"/>
            <ImageType Value="pdf"/>
            <ElementName Value="Photo1"/>
            <CropStyle Value="StretchFit"/>
          </PhotoAttributes>
        </Photo>
      </PhotoBookPage>
      <PhotoBookPage PartOrder="2">
        <PhotoBookPageAttributes>
          <TemplateName Value="StandardPortrait"/>
        </PhotoBookPageAttributes>
        <Photo>
          <PhotoAttributes>
            <Filename Value="page__P24786__0002.pdf"/>
            <ImageType Value="pdf"/>
            <ElementName Value="Photo1"/>
            <CropStyle Value="StretchFit"/>
          </PhotoAttributes>
        </Photo>
      </PhotoBookPage>
    </PhotoBookBookBlock>
    <NonPrintableMaterial>
        <NonPrintableMaterialAttributes>
          <Description Value="VelumSeparator012"/>
          <Quantity Value="1"/>
        </NonPrintableMaterialAttributes>
    </NonPrintableMaterial>
  </PhotoBook__8by10wrap>
  </CartItem>
</Order>
```

What is claimed is:

1. A computer-implemented method for multi-vendor printing, comprising:

maintaining, by a server computer, a data store comprising (1) information about service level agreements with a plurality of partner systems, wherein a partner system enables customers to order a plurality of customized print products, and wherein a service level agreement designates maximum delays for manufacturing customer print orders, and (2) characteristics of a plurality of print vendors, each print vendor capable of printing at least one of the plurality of customized print products;

receiving, by the server computer, a customer print order from one of the partner systems, the print order specifying a customized print product;

determining, by the server computer, a latest ship date for the customized print product that specifies the latest date to ship the customized print product to the customer to meet the maximum delay requirements of the applicable service level agreement;

selecting, by the server computer, one of the print vendors to manufacture the customized print product;

receiving, by the server computer, a plurality of updates from the selected print vendor each update indicating a processing state of the customized print product order; and relaying, by the server computer, the received updates to the partner system that issued the customer print order.

2. The method of claim 1 further comprising:

generating, by the server computer, a new order specifying the custom print product that includes information determined by the server computer.

3. The method of claim 2 wherein the information determined by the server computer comprises at least one member selected from the group consisting of a designation of a price, a designation of a shipping service, and a latest ship date.

4. The method of claim 1 wherein a customized print product includes at least one customized print element, provided by the customer, selected from the group consisting of customized text and a digital image, the method further comprising:

routing the new order, by the server computer, to the selected print vendor;

manufacturing, by the selected print vendor, the customized print product, wherein manufacturing comprises incorporating the at least one customized print element into the customized print product; and shipping, by the selected print vendor, the manufactured customized print product to the customer prior to the latest ship date.

5. The method of claim 1 wherein selecting one of the print vendors is based on the ability of the selected print vendor to manufacture the customized print product prior to the latest ship date.

6. The method of claim 5 wherein selecting one of the print vendors is further based on information received in real-time from the selected print vendor about its capacity to manufacture the customized print product prior to the latest ship date.

7. The method of claim 1 wherein selecting one of the print vendors comprises a real-time auction conducted between the server computer and the plurality of print vendors.

8. The method of claim 1 wherein selecting one of the print vendors is performed by evaluating a dynamic routing rule that uses updated information to optimize for one or more criteria relating to the performance of the plurality of print vendors.

9. The method of claim 8 wherein the one or more criteria are selected from the group consisting of a cost margin, a delivery time, a print quality and a capacity.

10. The method of claim 1 wherein the processing states indicated by the plurality of updates comprise:

the order was successfully received and accepted;

the order has been successfully processed and packaged; and the order has been shipped to the customer.

11. A server computer, comprising:

a processor;

a network interface card in communication with the processor;

a data storage for maintaining (1) information about service level agreements with a plurality of partner systems, wherein a partner system enables customers to order a plurality of customized print products, and wherein a service level agreement designates maximum delays for manufacturing customer print orders, and (2) characteristics of a plurality of print vendors, each print vendor capable of printing at least one of the plurality of customized print products; and a memory in communication with the processor for storing instructions, which when executed by the processor, cause the server:

to receive a customer print order from one of the partner systems, the print order specifying a customized print product;

to determine a latest ship date for the customized print product that specifies the latest date to ship the customized print product to the customer to meet the maximum delay requirements of the applicable service level agreement;

to selecting one of the print vendors to manufacture the customized print product;

to receive a plurality of updates from the selected print vendor each update indicating a processing state of the customized print product order; and to relaying the received updates to the partner system that issued the customer print order.

12. The server computer of claim 11 wherein said instructions further cause the server computer:

to generate a new order specifying the custom print product that includes information determined by the server computer.

13. The server computer of claim 12 wherein the information determined by the server computer comprises at least one member selected from the group consisting of a designation of a price, a designation of a shipping service, and a latest ship date.

14. The server computer of claim 11 wherein a customized print product includes at least one customized print element, provided by the customer, selected from the group consisting of customized text and a digital image, wherein said instructions further cause the server computer:

to route the order to the selected print vendor to be manufactured and shipped to the customer prior to the latest ship date.

15. The server computer of claim 11 wherein selecting one of the print vendors is based on the ability of the selected print vendor to manufacture the customized print product prior to the latest ship date.

16. The server computer of claim 15 wherein selecting one of the print vendors is further based on information received in real-time from the selected print vendor about its capacity to manufacture the customized print product prior to the latest ship date.

17. The server computer of claim 11 wherein selecting one of the print vendors comprises a real-time auction conducted between the server computer and the plurality of print vendors.

18. The server computer of claim 11 wherein selecting one of the print vendors is performed by evaluating a dynamic routing rule that uses updated information to optimize for one or more criteria relating to the performance of the print vendors.

19. The server computer of claim 18 wherein the one or more criteria are selected from the group consisting of a cost margin, a delivery time, a print quality and a capacity.

20. The server computer of claim 11 wherein the processing states indicated by the plurality of updates comprise:

the order was successfully received and accepted;

the order has been successfully processed and packaged; and the order has been shipped to the customer.

* * * * *